(12) United States Patent
Potter et al.

(10) Patent No.: US 7,220,211 B2
(45) Date of Patent: *May 22, 2007

(54) MULTISPEED POWER TOOL TRANSMISSION

(75) Inventors: Christine Potter, Baltimore, MD (US); Rodney Milbourne, Abington, MD (US); Todd A Hagan, Windsor, PA (US); Michael C Bowers, Littlestown, PA (US)

(73) Assignee: Black & Decker Inc., Newark, DE (US)

( * ) Notice: Subject to any disclaimer, the term of this patent is extended or adjusted under 35 U.S.C. 154(b) by 55 days.

This patent is subject to a terminal disclaimer.

(21) Appl. No.: 10/953,699

(22) Filed: Sep. 29, 2004

(65) Prior Publication Data

US 2005/0043135 A1    Feb. 24, 2005

Related U.S. Application Data

(60) Continuation of application No. 10/384,809, filed on Mar. 10, 2003, now Pat. No. 6,984,188, which is a division of application No. 09/964,078, filed on Sep. 26, 2001, now Pat. No. 6,676,557.

(60) Provisional application No. 60/263,379, filed on Jan. 23, 2001.

(51) Int. Cl.
*F16H 3/44* (2006.01)

(52) U.S. Cl. ............ 475/298; 475/263; 475/264; 475/265; 475/275; 475/279; 475/286; 475/299; 475/305; 475/317; 475/330; 173/47; 173/178; 173/216; 173/217

(58) Field of Classification Search ............... 475/298, 475/286, 263, 264, 265, 299, 270, 275, 279, 475/305, 317, 320, 330, 290; 173/178, 216, 173/217, 47, 48; 192/56.56, 56.61; 464/38
See application file for complete search history.

(56) References Cited

U.S. PATENT DOCUMENTS

| | | | |
|---|---|---|---|
| 1,228,472 | A | 6/1917 | Olson |
| 1,404,984 | A | 1/1922 | Lower |
| 1,514,872 | A | 11/1924 | Starr |
| 1,693,139 | A | 11/1928 | Dietsche |
| 1,792,484 | A | 2/1931 | Fawick |
| 1,909,330 | A | 5/1933 | Banker |

(Continued)

FOREIGN PATENT DOCUMENTS

DE    37 20 633    1/1988

(Continued)

OTHER PUBLICATIONS

FESTO Catalogue 96/97, pp. 1 through 4 and 10 through 19.

(Continued)

*Primary Examiner*—David D. Le
(74) *Attorney, Agent, or Firm*—Harness, Dickey & Pierce, P.L.C.

(57) ABSTRACT

A multi-speed transmission assembly for a rotary power tool. The transmission assembly includes a plurality of transmission stages, with at least two of the transmission stages employing a movable reduction element that permits the transmission stage to be operated in an active mode and an inactive mode. The movable reduction elements are coupled to a switching mechanism that switches the reduction elements in a predetermined manner to provide at least three-gear reduction or speed ratios.

68 Claims, 23 Drawing Sheets

U.S. PATENT DOCUMENTS

| | | | |
|---|---|---|---|
| 2,137,778 A | 11/1938 | McCullough | |
| 2,331,684 A | 10/1943 | Henningsen | |
| 2,848,908 A | 8/1958 | Hollis | |
| 2,911,854 A | 11/1959 | Fabian | |
| 3,055,236 A | 9/1962 | Born, Jr. | |
| 3,127,801 A | 4/1964 | Binns | |
| 3,774,476 A | 11/1973 | Sohnlein et al. | |
| 3,872,742 A | 3/1975 | States | |
| 3,878,926 A | 4/1975 | Adachi | |
| 3,901,104 A | 8/1975 | Sims | |
| 4,070,927 A * | 1/1978 | Polak | 475/286 |
| 4,178,813 A | 12/1979 | Smemo | |
| 4,274,023 A | 6/1981 | Lamprey | |
| 4,274,304 A | 6/1981 | Curtiss | |
| 4,366,871 A | 1/1983 | Dieterle et al. | |
| 4,418,766 A * | 12/1983 | Grossmann | 173/13 |
| 4,448,098 A | 5/1984 | Totsu | |
| 4,453,430 A * | 6/1984 | Sell | 475/116 |
| 4,493,223 A * | 1/1985 | Kishi et al. | 74/371 |
| 4,536,688 A * | 8/1985 | Roger | 318/490 |
| 4,569,252 A | 2/1986 | Harper | |
| 4,585,077 A | 4/1986 | Bergler | |
| 4,617,837 A | 10/1986 | Kataoka et al. | |
| 4,621,541 A * | 11/1986 | Takahashi | 475/146 |
| 4,641,551 A | 2/1987 | Pascaloff | |
| 4,651,580 A | 3/1987 | Deane | |
| 4,710,071 A | 12/1987 | Koehler et al. | |
| 4,757,598 A | 7/1988 | Redman | |
| 4,772,765 A | 9/1988 | Markle et al. | |
| 4,791,833 A * | 12/1988 | Sakai et al. | 475/299 |
| 4,842,078 A | 6/1989 | Hasson | |
| 4,869,131 A | 9/1989 | Ohmori | |
| 4,875,528 A | 10/1989 | Thackston | |
| 4,892,013 A * | 1/1990 | Satoh | 475/266 |
| 4,908,926 A * | 3/1990 | Takeshima et al. | 29/407.02 |
| 5,005,682 A | 4/1991 | Young et al. | |
| 5,019,023 A | 5/1991 | Kurosawa | |
| 5,050,291 A | 9/1991 | Gilmore | |
| 5,159,986 A | 11/1992 | Höser | |
| 5,176,593 A | 1/1993 | Yasui et al. | |
| 5,277,527 A | 1/1994 | Yokota et al. | |
| 5,282,510 A | 2/1994 | Pacher | |
| 5,301,565 A | 4/1994 | Weismann et al. | |
| 5,339,908 A | 8/1994 | Yokota et al. | |
| 5,451,127 A * | 9/1995 | Chung | 408/20 |
| 5,550,416 A | 8/1996 | Fanchang et al. | |
| 5,551,927 A | 9/1996 | Enzmann et al. | |
| 5,573,074 A | 11/1996 | Thames et al. | |
| 5,598,911 A | 2/1997 | Joachim et al. | |
| 5,601,491 A | 2/1997 | Chan | |
| 5,692,575 A | 12/1997 | Hellstrom | |
| 5,704,433 A | 1/1998 | Bourner et al. | |
| 5,730,232 A | 3/1998 | Mixer | |
| 5,842,527 A | 12/1998 | Arakawa et al. | |
| 5,897,454 A | 4/1999 | Cannaliato | |
| 5,903,462 A | 5/1999 | Wagner et al. | |
| 5,967,934 A | 10/1999 | Ishida et al. | |
| 6,062,114 A | 5/2000 | Rahm | |
| 6,070,675 A | 6/2000 | Mayer et al. | |
| 6,076,438 A | 6/2000 | Rahm | |
| 6,086,502 A | 7/2000 | Chung | |
| 6,093,128 A | 7/2000 | Seith | |
| 6,142,242 A | 11/2000 | Okumura et al. | |
| 6,305,481 B1 | 10/2001 | Yamazaki et al. | |
| 6,431,289 B1 | 8/2002 | Potter et al. | |
| 6,457,535 B1 | 10/2002 | Tanaka | |
| 6,502,648 B2 | 1/2003 | Milbourne | |
| 6,599,219 B2 | 7/2003 | Pan | |
| 2004/0211576 A1 | 10/2004 | Milbourne et al. | |

FOREIGN PATENT DOCUMENTS

| | | |
|---|---|---|
| DE | 39 04 085 | 11/1990 |
| DE | 40 38 226 | 6/1992 |
| DE | 40 38 502 | 2/1994 |
| DE | 44 06 018 | 4/1995 |
| DE | 42 13 291 | 12/1997 |
| DE | 199 03 863 | 8/2000 |
| EP | 88101883.2 | 2/1988 |
| EP | 0 787 931 | 1/1997 |
| EP | 0 519 121 | 4/1997 |
| FR | 1 072 143 | 9/1954 |
| GB | 2 102 515 | 2/1983 |
| JP | 49-56 276 | 5/1974 |
| JP | 57-139 330 | 8/1982 |
| JP | 58-4 308 | 1/1983 |
| JP | 60-34 275 | 2/1985 |
| JP | 62-224 584 | 10/1987 |
| JP | 63-101545 | 5/1988 |
| JP | 63-96 354 | 6/1988 |
| JP | 06320435 A | 11/1994 |
| WO | WO 97/33721 | 9/1997 |
| WO | WO 99/16585 | 4/1999 |
| WO | WO 00/23727 | 4/2000 |

OTHER PUBLICATIONS

FESTOOL Festo Tooltechnic CDD 9,6ES Exploded View (475 895 / 10.99).

Tools of the Trade Online: Stop The Pain (Spring 1998).

* cited by examiner

MULTISPEED POWER TOOL TRANSMISSION

PRIORITY & CROSS-REFERENCE TO RELATED APPLICATIONS

This application is a continuation of U.S. application Ser. No. 10/384,809 filed Mar. 10, 2003 now U.S. Pat. No. 6,984,188, which is a divisional of U.S. application Ser. No. 09/964,078 filed Sep. 26, 2001 now U.S. Pat. No. 6,676,557 entitled First Stage Clutch, which claims the benefit of U.S. Provisional Application No. 60/263,379, filed Jan. 23, 2001.

BACKGROUND OF THE INVENTION

1. Technical Field

The present invention relates generally to power tools such as rotatable drills, power screwdrivers, and rotatable cutting devices. More particularly, the present invention relates to a transmission for a multi-speed transmission for a rotary power tool.

2. Discussion

Modernly, manufacturers of power tools have introduced rotary power tools that have variable speed motors in an attempt to permit the users of these tools with sufficient control over the output speed of the tool so as to permit them to perform diverse operations without resort to additional, specialized tools. Many of the tools that are commercially available include a three-stage, two-speed transmission that permits even greater control over speeds of these tools.

Typically, the known transmission arrangements have lacked a transmission arrangement that could produce a wide range of output speeds and torques that would permit the tool to perform diverse operations such as drilling holes with a large diameter hole saw, installing drywall screws or large diameter lag screws, and performing high-speed drilling operations. The single or dual speed transmissions that were generally employed in these tools typically did not have sufficient speed reducing capacity to permit these transmissions to be diversely employed as configuring these tools for high torque operations tended to impair their high speed performance. Furthermore, the rechargeable batteries that were employed in many of the early cordless rotary power tools were not well suited for use in low-speed, high torque operations due to the amount of energy that is consumed and the rate with which the energy is consumed by the power tool during such operations. Consequently, consumers were often forced to purchase two different rotary power tools, a medium-duty tool for "standard" applications such as drilling and fastening, and a heavy-duty tool having a low-speed, high torque output for more demanding tasks.

With the advent of the modern high capacity, high voltage battery, it is now possible to meet the energy demands of a power tool that is used in low-speed, high torque operations. There remains, however, a need in the art for a power tool transmission having a relatively large range in its speed reducing capacity.

SUMMARY OF THE INVENTION

In one form, the present teachings provide a mid-handle drill with a transmission having at least three speed ratios.

In another form, the present teachings provide a power tool for performing at least a drilling operation. The power tool includes a housing, a motor disposed in the housing, an output spindle and a transmission that is disposed between the motor and the output spindle. The transmission receives a rotary input from the motor and is configured to provide an output that is transmitted to the output spindle. The transmission is characterized in that its centerline is coincident with a rotational axis of an output member of the motor, it has at least three speed ratios and it is contained within a volume that is about equal in diameter to a diameter of the motor.

In yet another form, the present teachings provide a power tool for performing at least a drilling operation wherein the power tool has a three-speed planetary transmission that cooperates with a motor to drive an output member.

In still another form, the present teachings provide a power tool for performing at least a drilling operation wherein the power tool includes a housing with a front portion, a rear portion and a handle that is intermediate the front and rear portions, a motor in the housing, an output device, and a transmission connecting the motor and the output device. The transmission is operable in at least three speed ratio settings.

In yet another form, the present teachings provide a method for forming a power tool that is configured to perform at least a drilling operation. The method includes: installing at least a portion of a three speed transmission into a first housing; installing the first housing at least partially into a second housing; coupling the transmission to an output device, the output device being configured to drive a drill.

In a further form, the present teachings provide a modular drive system for a power tool comprising a transmission sleeve and a planetary transmission that is at least partially received into the transmission sleeve, the planetary transmission being configured to provide at least three separately selectable speed ratios.

In yet another form, the present teachings provide a method for drilling a hole that includes moving an annular collar associated with a planetary transmission to select one of at least three speed ratios.

In a further form, the present teachings provide a handheld power tool that includes a motor, an output spindle, and a transmission drivingly connected with the motor and the output spindle, the transmission having a plurality of stages that cooperate to provide three speed ratios, each speed ratio using three stages that are arranged such that the output of one stage is input to a subsequent stage.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Overview

Figure 1:
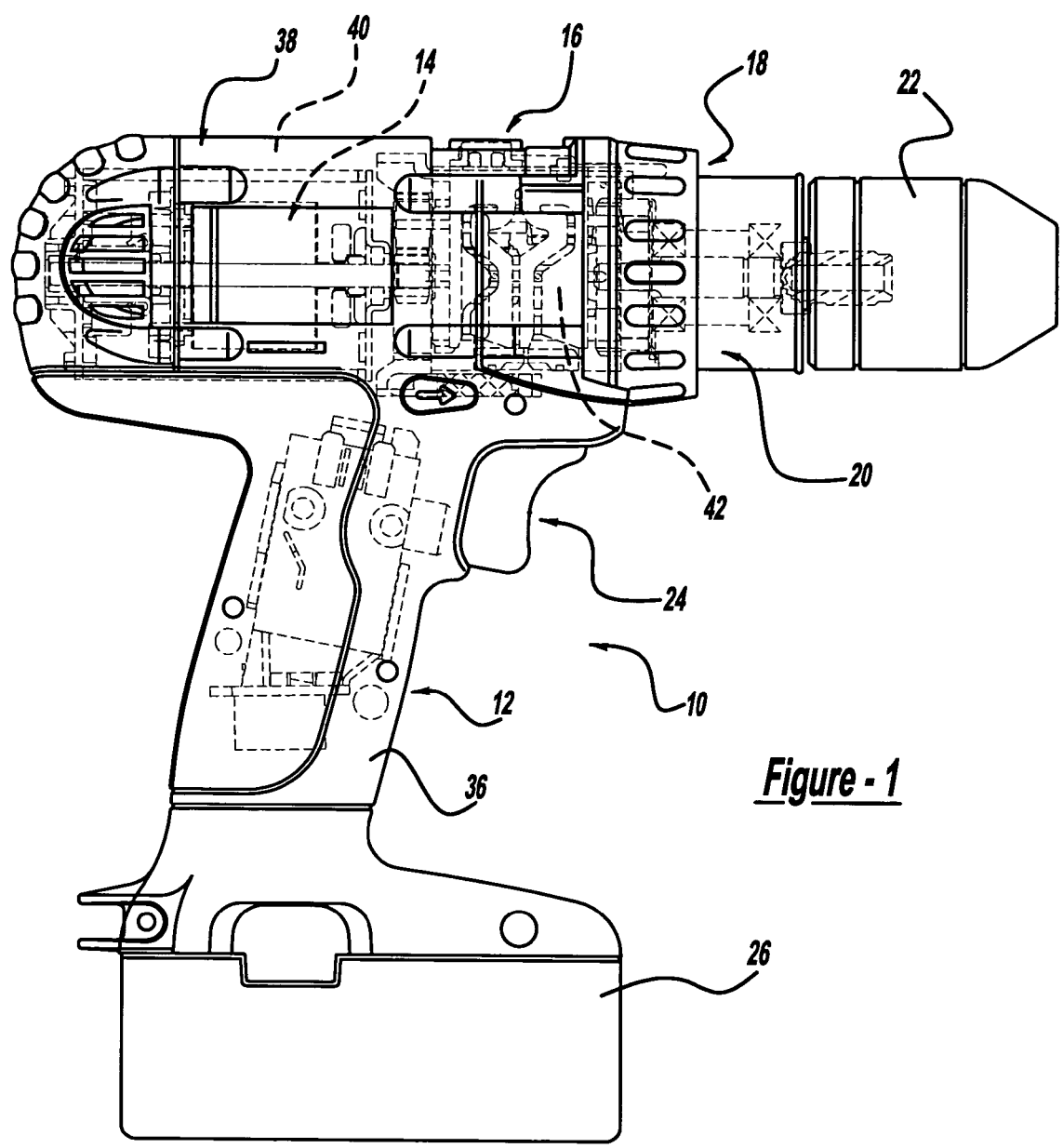
FIG. 1 is a side view of a power tool constructed in accordance with the teaching of the present invention.
Figure 2:
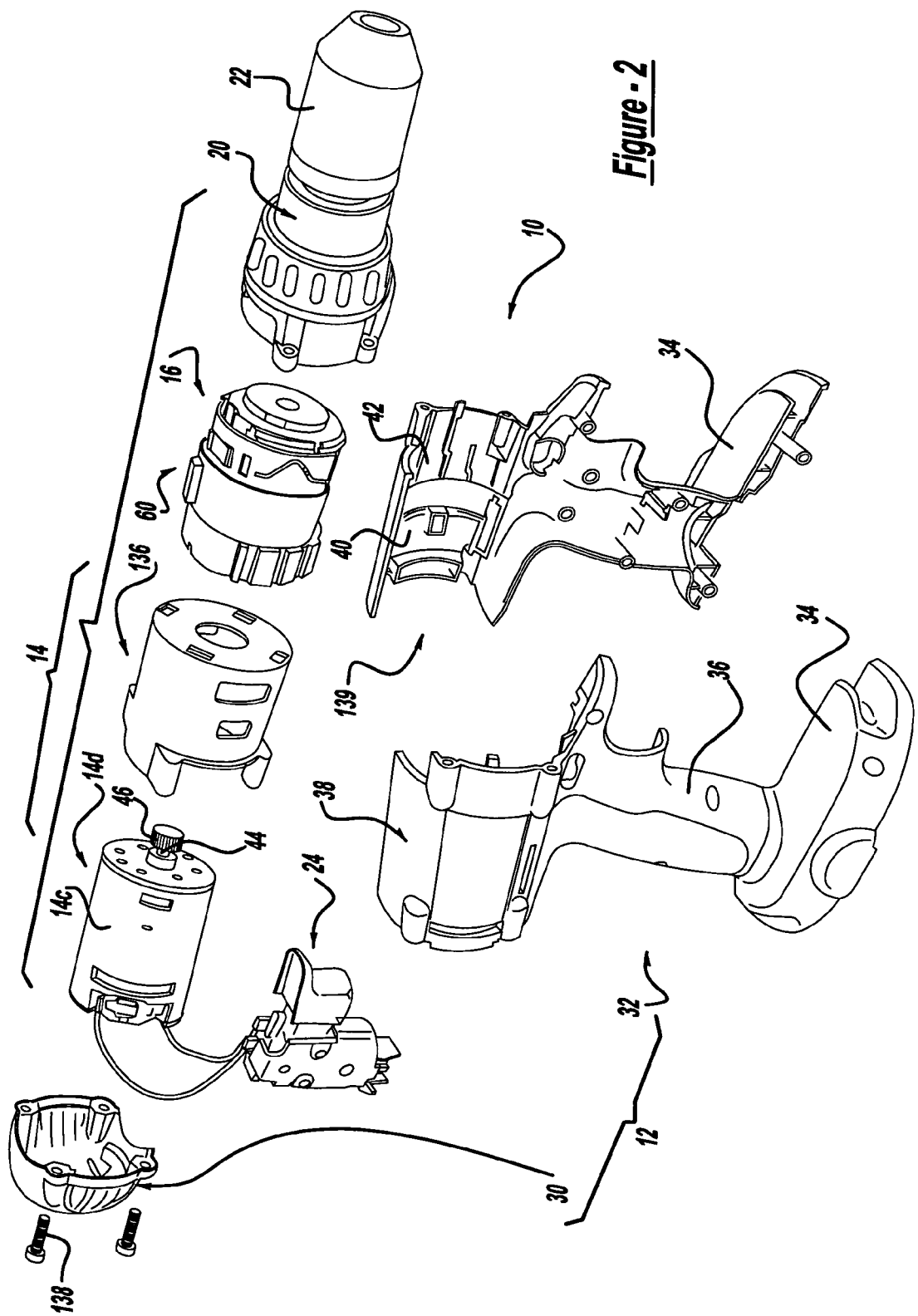
FIG. 2 is an exploded perspective view of a portion of the power tool of FIG. 1.
Figure 3:
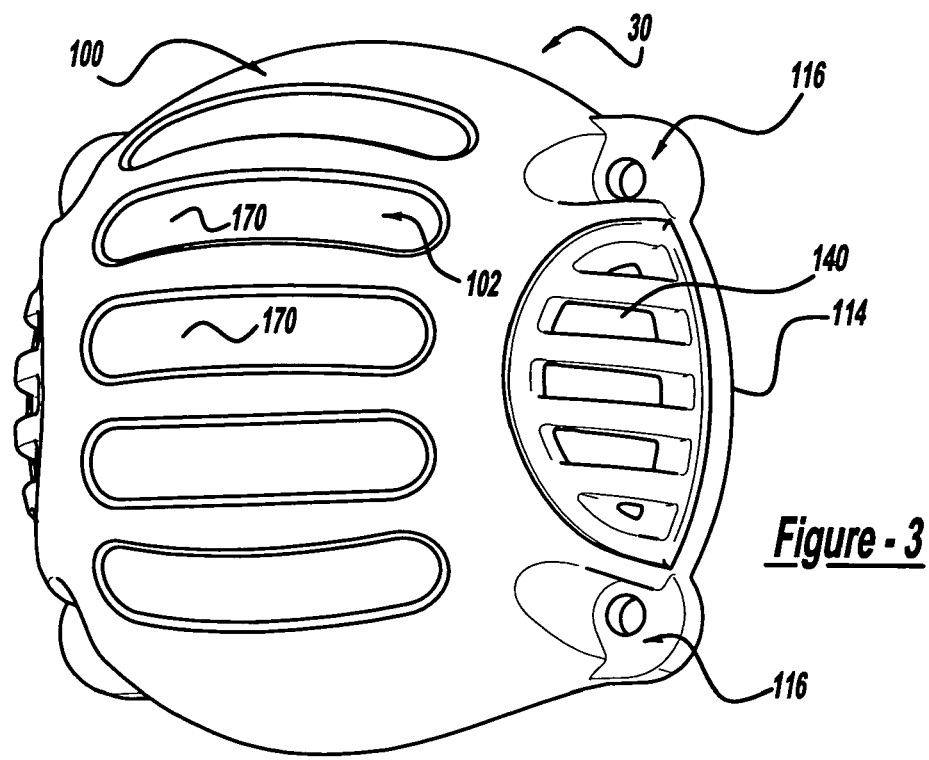
FIG. 3 is a perspective view of a portion of the housing of the power tool of FIG. 1 illustrating the rear of the end cap assembly.
Figure 4:
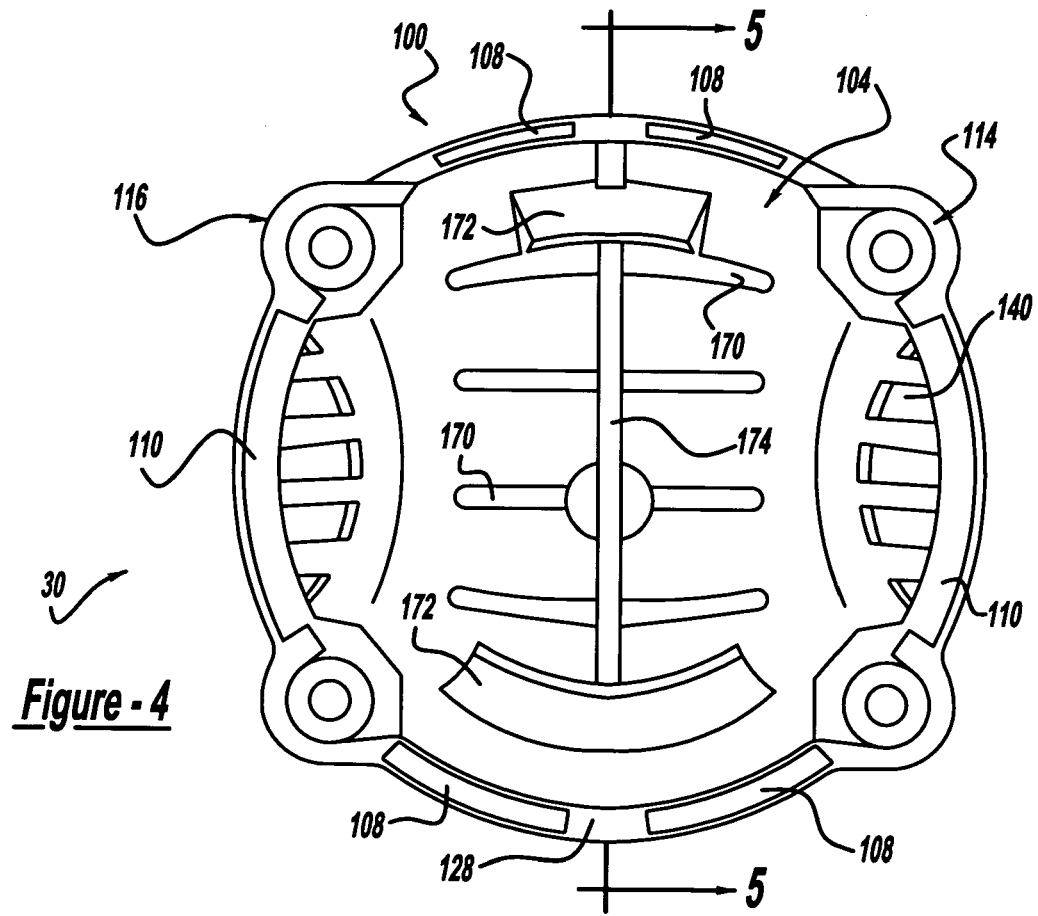
FIG. 4 is a front view of the end cap assembly.
Figure 5:
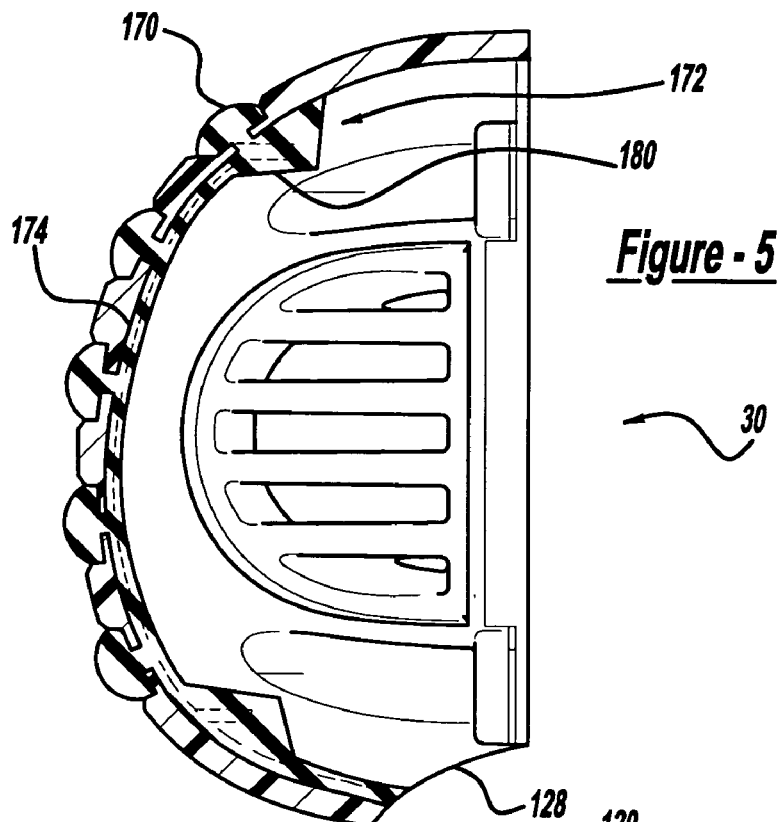
FIG. 5 is a section view taken along the line 5—5 of FIG. 4.
Figure 6:
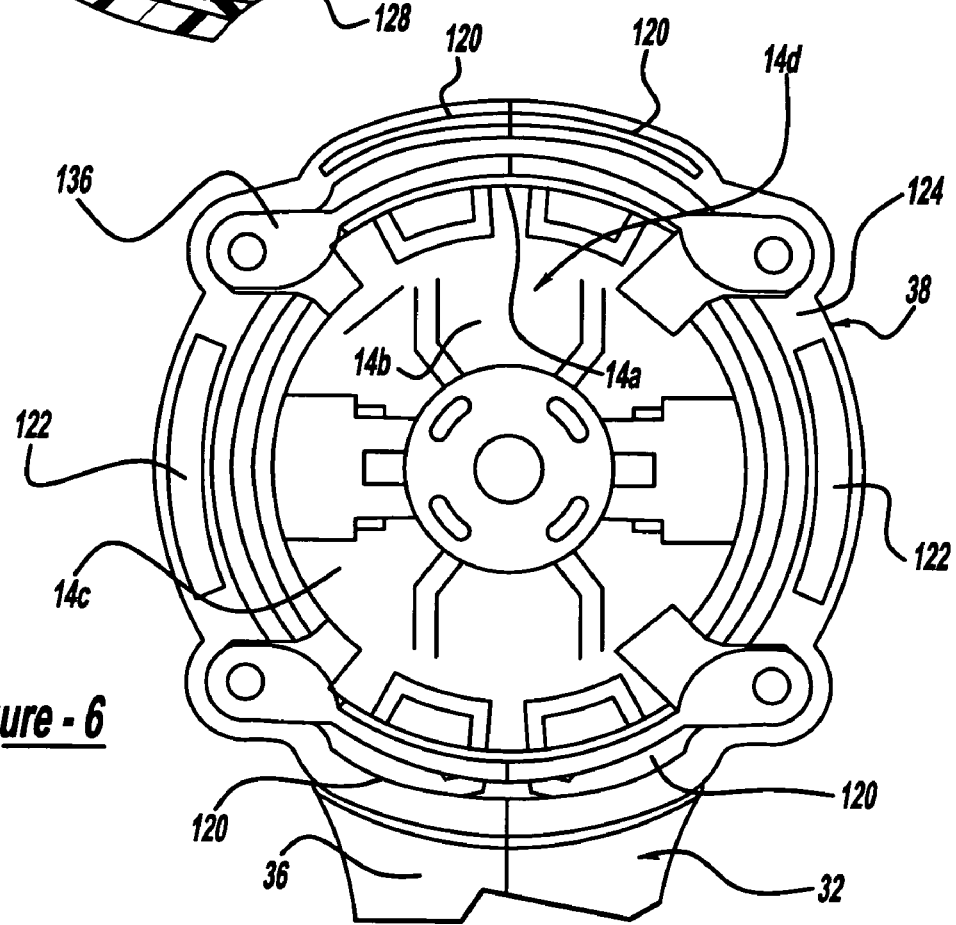
FIG. 6 is a rear view of a portion of the power tool of FIG. 1 with the end cap assembly removed.
Figure 7:
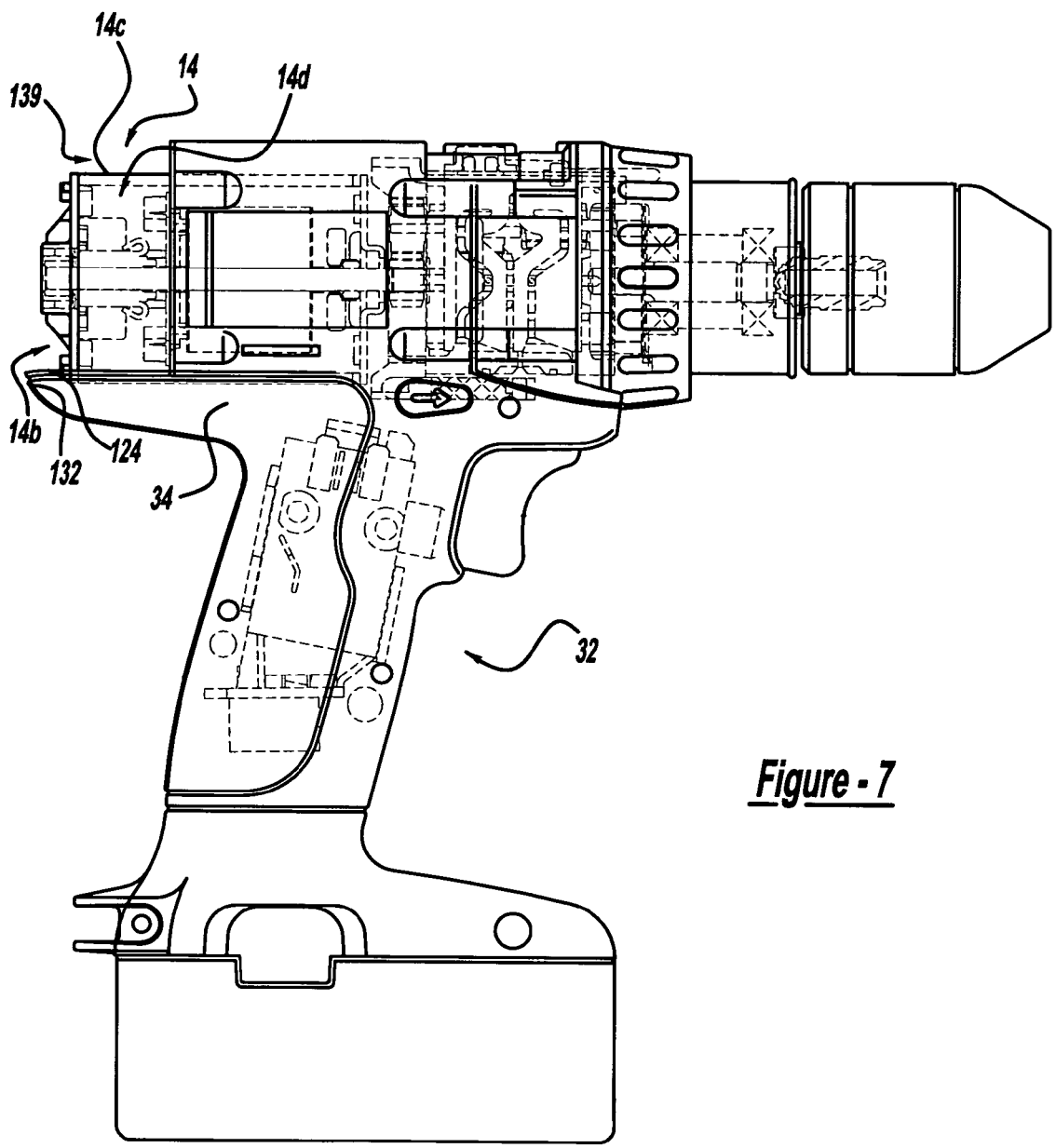
FIG. 7 is a side view of a portion of the power tool of FIG. 1 with the end cap assembly removed.
Figure 8:
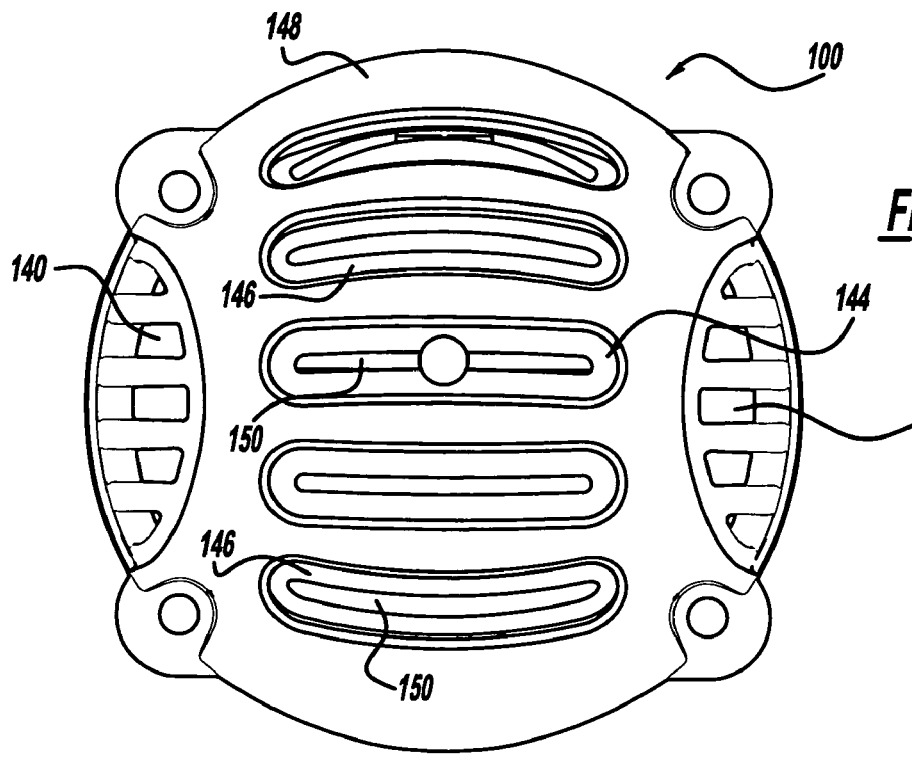
FIG. 8 is a view similar to that of FIG. 4, but illustrating the end cap shell prior to the overmolding operation.
Figure 9:
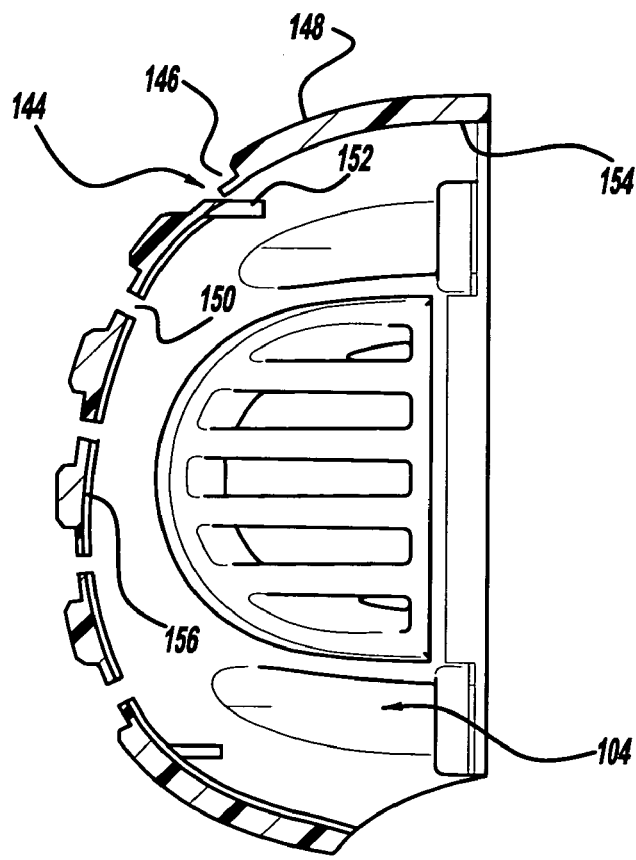
FIG. 9 is a view similar to that of FIG. 5, but illustrating the end cap shell prior to the overmolding operation.

With reference to FIGS. 1 and 2 of the drawings, a power tool constructed in accordance with the teachings of the present invention is generally indicated by reference numeral 10. As those skilled in the art will appreciate, the preferred embodiment of the present invention may be either a cord or cordless (battery operated) device, such as a portable screwdriver or drill. In the particular embodiment illustrated, power tool 10 is a cordless drill having a housing 12, a motor assembly 14, a multi-speed transmission assembly 16, a clutch mechanism 18, an output spindle assembly 20, a chuck 22, a trigger assembly 24 and a battery pack 26. Those skilled in the art will understand that several of the components of power tool 10, such as the chuck 22, the trigger assembly 24 and the battery pack 26, are conventional in nature and need not be described in significant detail in this application. Reference may be made to a variety of publications for a more complete understanding of the operation of the conventional features of power tool 10. One example of such publications is commonly assigned U.S. Pat. No. 5,897,454 issued Apr. 27, 1999, the disclosure of which is hereby incorporated by reference as if fully set forth herein.

Housing 12 includes an end cap assembly 30 and a handle shell assembly 32 that includes a pair of mating handle shells 34. Handle shell assembly 32 includes a handle portion 36 and a drive train or body portion 38. Trigger assembly 24 and battery pack 26 are mechanically coupled to handle portion 36 and electrically coupled to motor assembly 14. Body portion 38 includes a motor cavity 40 and a transmission cavity 42. Motor assembly 14 is housed in motor cavity 40 and includes a rotatable output shaft 44, which extends into transmission cavity 42. A motor pinion 46 having a plurality of gear teeth 48 is coupled for rotation with output shaft 44. Trigger assembly 24 and battery pack 26 cooperate to selectively provide electric power to motor assembly 14 in a manner that is generally well known in the art so as to control the speed and direction with which output shaft 44 rotates.

Transmission assembly 16 is housed in transmission cavity 42 and includes a speed selector mechanism 60. Motor pinion 46 couples transmission assembly 16 to output shaft 44, transmitting a relatively high speed, low torque drive input to transmission assembly 16. Transmission assembly 16 includes a plurality of reduction elements that are selectively engaged by speed selector mechanism 60 to provide a plurality of speed ratios. Each of the speed ratios multiplies the speed and torque of the drive input in a predetermined manner, permitting the output speed and torque of the transmission assembly 16 to be varied in a desired manner between a relatively low speed, high torque output and a relatively high speed, low torque output. The transmission output is delivered the output spindle assembly 20, to which the chuck 22 is coupled for rotation, to permit torque to be transmitted to a tool bit (not shown). The clutch mechanism 18 is coupled to transmission assembly 16 and is operable for limiting the magnitude of the torque associated with the drive input to a predetermined, selectable torque limit.

Functional Overmold

With specific reference to FIGS. 2 through 9, end cap assembly 30 is shown to include an end cap shell 100 and an overmold member 102. In the example provided, the end cap shell 100 is injection molded from a plastic material, such as ABS. The end cap shell 100 defines an end cap cavity 104 that is sized to receive the portion of the motor assembly 14 that extends rearwardly of the handle shell assembly 32. A plurality of first and second radial tab apertures 108 and 110 and the abutting face 128 are formed into the forward face 114 of the end cap shell 100 and a plurality of screw bosses 116 are formed into the perimeter of the end cap shell 100. Each of the first and second radial tab apertures 108 and 110 is sized to receive one of the first radial tabs 120 and second radial tabs 122, respectively, that are formed into the rearward face 124 of the handle shells 34. The first and second radial tab apertures 108 and 110 cooperate with the first and second radial tabs 122 to properly align the end cap shell 100 to the handle shell assembly 32, as well as to inhibit relative rotation therebetween. An arcuate portion 128 of the forward face 114 of the end cap shell 100 is angled to match the abutting face 132 of the rearward face 124 of the handle shells 34. The screw bosses 116 permit the end cap shell 100 to be fixedly coupled to the motor cover 136 via a plurality of screws 138. The geometry of the motor cover 136 is such that it is constrained to the handle shells 34. As such, fastening of the end cap shell 100 to the motor cover 136 operates to fixedly retain the end cap shell 100 against the rearward face 124 of the handle shell assembly 32, as well as to close off the rear handle aperture 139 in the handle shell assembly 32.

A plurality of side apertures 140 are formed into the sides of the end cap shell 100 to permit air to flow through the handle shell assembly 32 and cool the motor assembly 14 in a manner that is well known in the art. A plurality of rear apertures 144 are formed into the rear of the end cap shell 100, with each of the rear apertures 144 including a recessed portion 146 that extends only partially into the outer surface 148 of the end cap shell 100 and a through-portion 150 that extends completely through the end cap shell 100. A pair of retaining tabs 152 are formed to extend from the interior surface 154 of the end cap shell 100 inwardly into the end cap cavity 104. A channel 156 is formed into the interior surface 154 of the end cap shell 100 and intersects each of the rear apertures 144 and the retaining tabs 152.

The overmold member 102 is formed from a resilient material, such as thermoplastic elastomer (e.g., HYTREL® manufactured by E.I. du Pont de Nemours and Company) and is simultaneously formed and coupled to the end cap shell 100 in an injection molding operation. In the particular example provided, the overmold member 102 includes a plurality of bumper members 170, a pair of isolators 172 and a linking member 174. Each of the bumper members 170 extends from a point roughly coincident with the interior surface 154 of the end cap shell 100 to a point rearwardly of the outer surface 148 of the end cap shell 100 by about 0.5 mm to about 1.5 mm and preferably about 0.75 mm. Construction in this manner permits the bumper members 170 to provide a degree of shock absorption which reduces the likelihood of damaging the end cap shell 100 in the event that the tool 10 is dropped. Furthermore, it is sometimes necessary for an operator to apply a relatively high force to the tool 10, as when employing a hole saw to drill large diameter holes. In such situations, the operator is inclined to press onto the rear of the tool 10 to apply a force that is in-line with the axis of the chuck 22. In such situations, the bumper members 170 provide the operator with a relatively soft and comfortable surface which tends to resist slipping as well as attenuate the vibrations that are transmitted to the operator.

The isolators 172 are formed about the retaining tabs 152 on the interior surface 154 of the end cap shell 100. In the example provided, each of the isolators 172 includes an annular member 180 that extends forwardly of the interior surface 154 of the end cap shell 100. Construction in this manner permits the end cap shell 100 to engage the isolators 172 to the outer diameter 14a and the rear surface 14b of the motor housing 14c to fixedly retain the motor 14d within the motor cover 136. This prevents the components of the motor assembly 14 from moving along the longitudinal axis of the tool 10, as well as dampens vibrations that are created during the operation of the motor assembly 14. The linking member 174 is fixedly coupled to each of the bumper members 170 and the isolators 172. The linking member 174 provides a flow path through which the resilient material flows during the formation of the bumper members 170 and the isolators 172. The linking member 174 also interconnects the bumper members 170 and the isolators 172, thereby rendering their removal from the end cap shell 100 more difficult.

Figure 10:
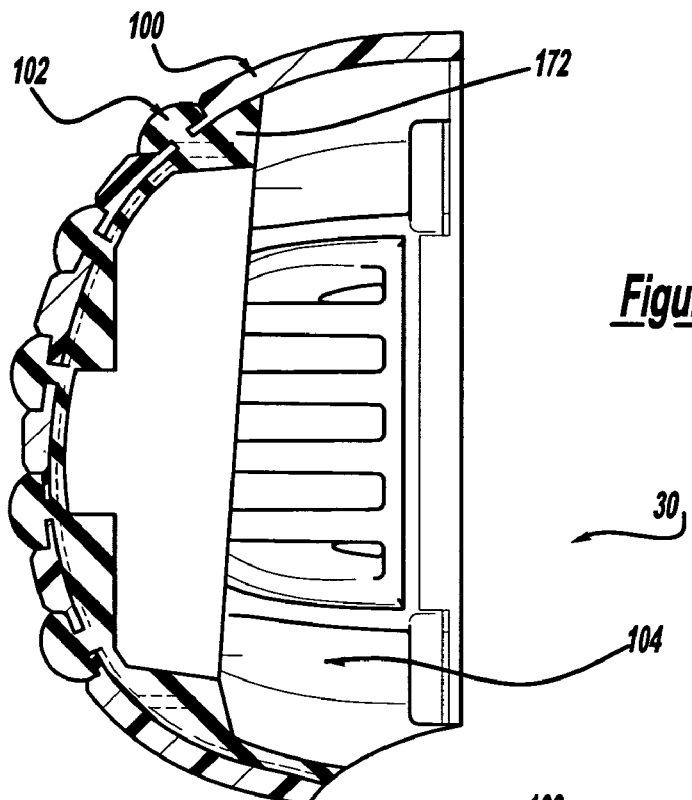
FIG. 10 is a view similar to that of FIG. 4, but illustrating an alternate construction of the overmold member.
Figure 11:
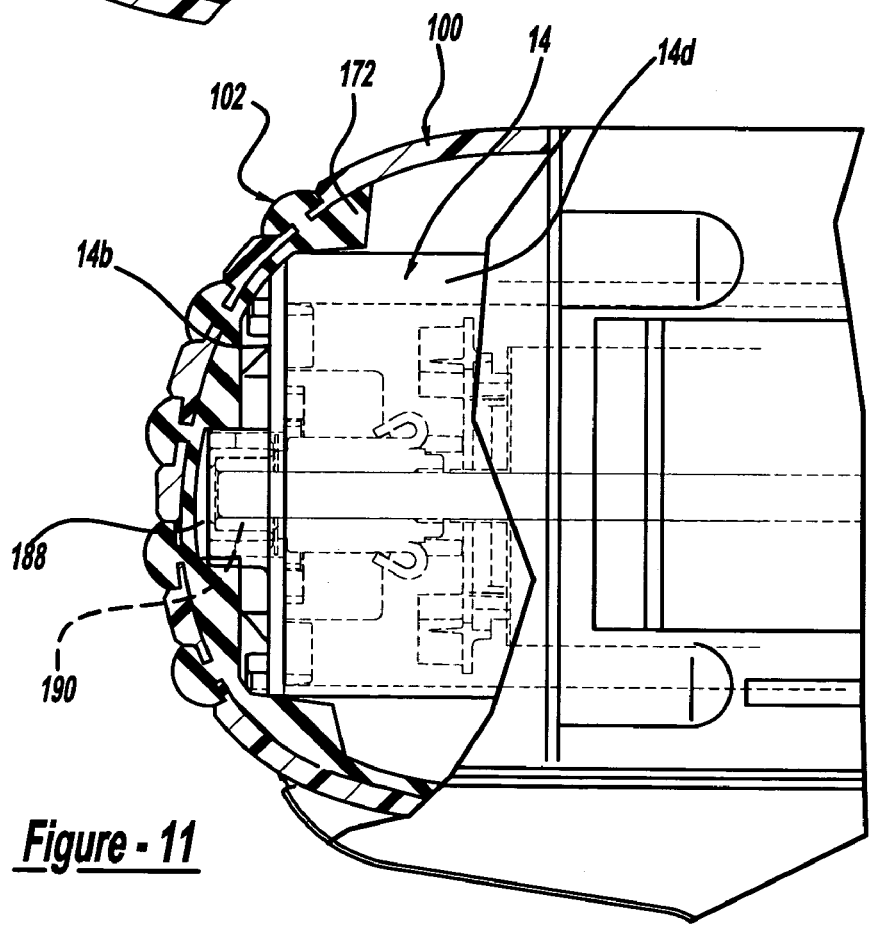
FIG. 11 is a partial sectional view of a portion of a power tool that employs an end cap assembly having an overmold member constructed in the manner illustrated in FIG. 10.

Those skilled in the art will appreciate that this aspect of the present invention may be incorporated into various other positions within the handle assembly 32 for sealing between two or more components, dampening vibrations or positioning one component relative to another. One such example is illustrated in FIGS. 10 and 11 where the isolators 172 are modified to extend around the perimeter of a portion of the end cap cavity 104 and sealingly contact the rear surface 14b of the motor 14d. The isolators 172 seal the interface between the end cap shell 100 and the motor assembly 14, while the bumper members 170 seal the rear apertures 144 in the end cap shell 100. The space 188 defined by the isolators 172 is then filled with grease or another suitable lubricant, which lubricates a motor armature bearing 190.

Transmission Assembly

Figure 12:
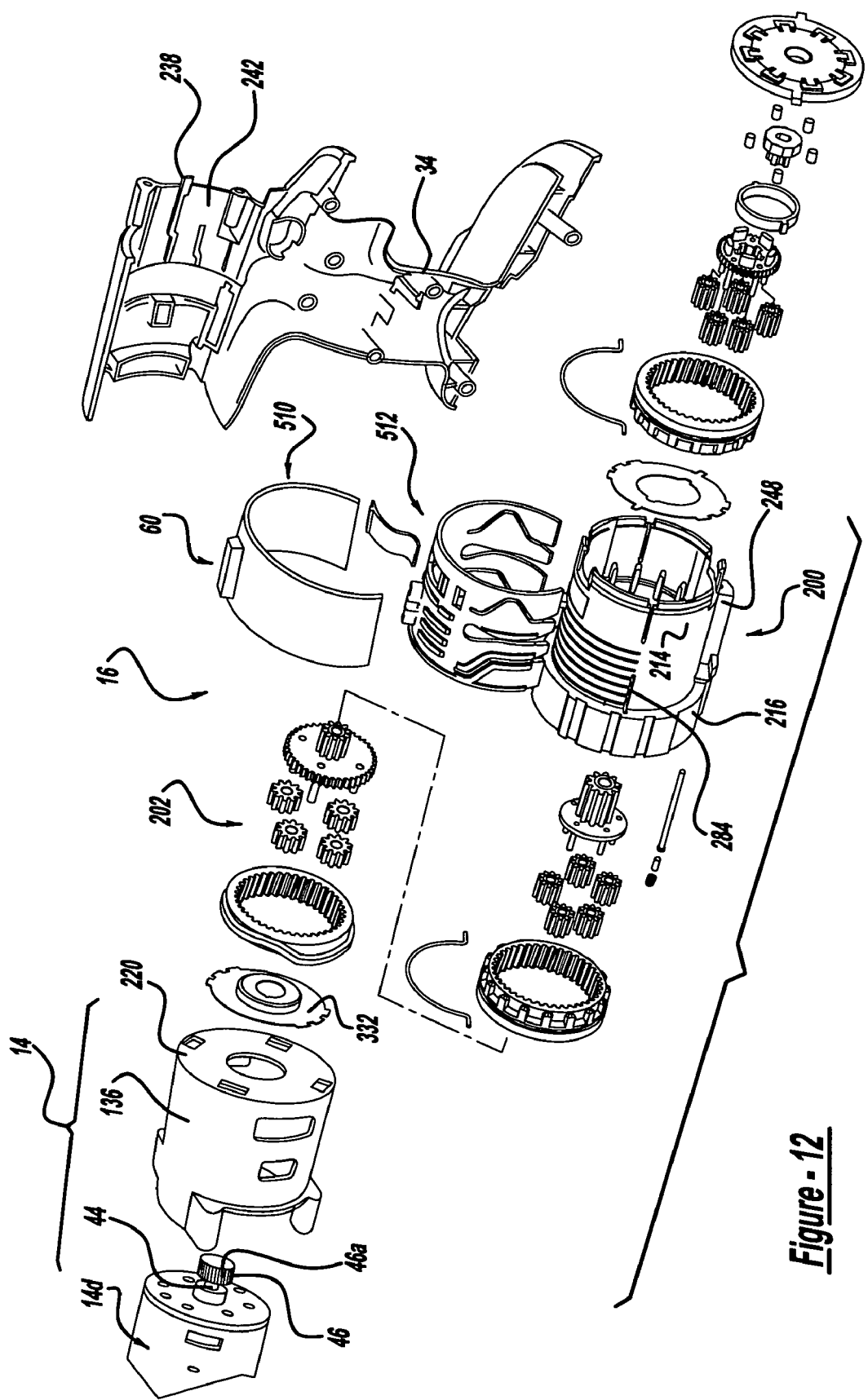
FIG. 12 is an exploded perspective view of a portion of the power tool of FIG. 1, illustrating the transmission assembly in greater detail.

With reference to FIG. 12, the transmission assembly 16 is shown to be a three-stage, three-speed transmission that includes a transmission sleeve 200, a reduction gearset assembly 202 and the speed selector mechanism 60. With additional reference to FIGS. 13 through 17, the transmission sleeve 200 includes a wall member 210 that defines a generally transmission bore or hollow cavity 212 into which the reduction gearset assembly 202 is disposed. The transmission sleeve 200 includes a body 214 and a base 216. The body 214 of the transmission sleeve 200 is fairly uniform in diameter and generally smaller in diameter than the base 216. The inside diameter of the base 216 is sized to receive the cylindrical nose portion 220 of the motor cover 136.

A plurality of raised lands 226 are formed into the base 216. The raised lands 226 define a plurality of first grooves 228 in the outer surface 230 of the base 216 and a plurality of second grooves 232 in the inner surface 234 of the base 216. The first grooves 228 are configured to receive the alignment ribs 238 that are formed into the inner surface 242 of the handle shells 34 to align the transmission sleeve 200 to the handle shells 34 and inhibit relative rotation between the transmission sleeve 200 and the housing 12. Preferably, the first grooves 228 and alignment ribs 238 are configured in a manner that the transmission sleeve 200 can only be assembled to the handle shells 34 in one orientation (i.e., the configuration of the first grooves 228 and alignment ribs 238 prevents the transmission sleeve 200 from being rotated 180° out of position relative to the handle shells 34). The second grooves 232 will be discussed in greater detail, below.

The body 214 of the transmission sleeve 200 is shown to include a cylindrical body portion 246 and a pin housing portion 248. In the particular embodiment illustrated, the cylindrical body portion 246 includes a selector cam guide 250, a plurality of lubricant grooves 252 and first and second sets of ring engagement teeth 254 and 256, respectively. The selector cam guide 250 is generally rectangular in cross section, extending outwardly from the top of the outer surface 258 of the body portion 246. The lubricant grooves 252 are formed concentrically around the upper half of the perimeter of the body portion 246. The lubricant grooves 252 have a depth of about 0.01 inch to about 0.030 inch to hold a lubricant, such as grease, on the upper half of the perimeter of the body portion 246. The operation of the selector cam guide 250 and the lubricant grooves 252 will be discussed in detail, below.

A raised bead 264 segregates the interior of the body portion 246 into first and second housing portions 260 and 262, respectively. The first set of ring engagement teeth 254 are formed onto the inner surface 266 of the body portion 246 and extend rearwardly from the raised bead 264 toward the base 216. The second set of ring engagement teeth 256 are also formed into the inner surface of the body portion 246 but extend forwardly from the raised bead 264. The teeth 268 of the first and second sets of ring engagement teeth 254 and 256 are uniformly spaced around the inner surface 266 of the body portion 246. The configuration of each tooth 268 in the first and second sets of ring engagement teeth 254 and 256 is similar in that each tooth extends from the raised bead 264, has a pair of parallel engagement surfaces 270 and terminates at a tip portion 272. The tip portion 272 of each tooth 268 is both rounded and tapered to enhance the ability with which it will mesh with a portion of the reduction gearset assembly 202 as will be described in detail, below.

The pin housing portion 248 extends downwardly from the body portion 246 over a significant portion of the length of the body portion 246. An actuator aperture 274 is formed into the pin housing portion 248 and extends rearwardly through the base 216 of the transmission sleeve 200. In the particular embodiment illustrated, the actuator aperture 274 is stepped, having a first portion 276 with a first diameter at the rear of the transmission sleeve 200 and a second portion 278 with a smaller second diameter at the front of the transmission sleeve 200. In the example shown, the first portion 276 of the actuator aperture 274 breaks through the wall of the first housing portion 260 and forms a groove 280 into the inner surface 234 of the base 216. The pin housing portion 248 will be discussed in further detail, below.

A pair of first clip slots 284 and a pair of second clip slots 286 are formed into the transmission sleeve 200, extending along the sides of the transmission sleeve 200 in a manner that is parallel the longitudinal axis of the transmission sleeve 200. The first pair of clip slots 284 is formed through the sides of the body portion 246 rearwardly of the raised bead 264 and extends rearwardly toward the base 216. The depth of the first pair of clip slots 284 is such that they do not extend through the portion of the wall member 210 that defines the base 216. The second pair of clip slots 286 are also formed through the sides of the body portion 246 beginning forwardly of the raised bead 264 and extending through the front face 288 of the transmission sleeve 200.

With reference to FIGS. 12, 13, 18 and 23, the reduction gearset assembly 202 includes a first reduction gear set 302, a second reduction gear set 304 and a third reduction gear set 306. The first reduction near set 302 is operable in an active mode, while the second and third reduction gear sets 304 and 306 are operable in an active mode and an inactive mode. Operation in the active mode causes the reduction gear set to perform a speed reduction and torque multiplication operation, while operation of the reduction gear set in an inactive mode causes the reduction gear set to provide an output having a speed and torque that is about equal to the speed and torque of the rotary input provided to that reduction gear set. In the particular embodiment illustrated, each of the first, second and third reduction gear sets 302, 304 and 306 are planetary gear sets. Those skilled in the art will understand, however, that various other types of reduction gear sets that are well known in the art may be substituted for one or more of the reduction gear sets forming the reduction gearset assembly 202.

As shown, the first reduction gear set 302 includes a first reduction element or ring gear 310, a first set of planet gears 312 and a first reduction carrier 314. The first ring gear 310 is an annular structure, having a plurality of gear teeth 310*a* formed along its interior diameter. A clutch face 316 is formed into the outer perimeter of the front face 318 of the first ring gear 310 and will be discussed in greater detail, below. The first ring gear 310 is disposed within the portion of the hollow cavity 212 defined by the base 216; the front face 318 of the first ring gear 310 contacts a step 320 formed into the transmission sleeve 200, thereby limiting the ability of the first ring gear 310 to move forwardly into the hollow cavity 212.

The first reduction carrier 314 is formed in the shape of a flat cylinder, having plurality of pins 322 that extend from its rearward face 324. A plurality of gear teeth 314*a* are formed into almost the entire outer perimeter of the first reduction carrier 314, with a valley 314*b* being formed between each pair of adjacent gear teeth 314*a*. Due to the spacing of the gear teeth 314*a*, one of the valleys (i.e., valley 314*b*′) is relatively larger than the remaining valleys 314*b* due to the omission of a tooth 314*a* in the outer perimeter of the first reduction carrier 314. In the particular embodiment illustrated, the gear teeth 314*a* of the first reduction carrier 314 are configured so as not to be meshingly engagable with the gear teeth 310*a* of the first ring gear 310.

Figure 19:
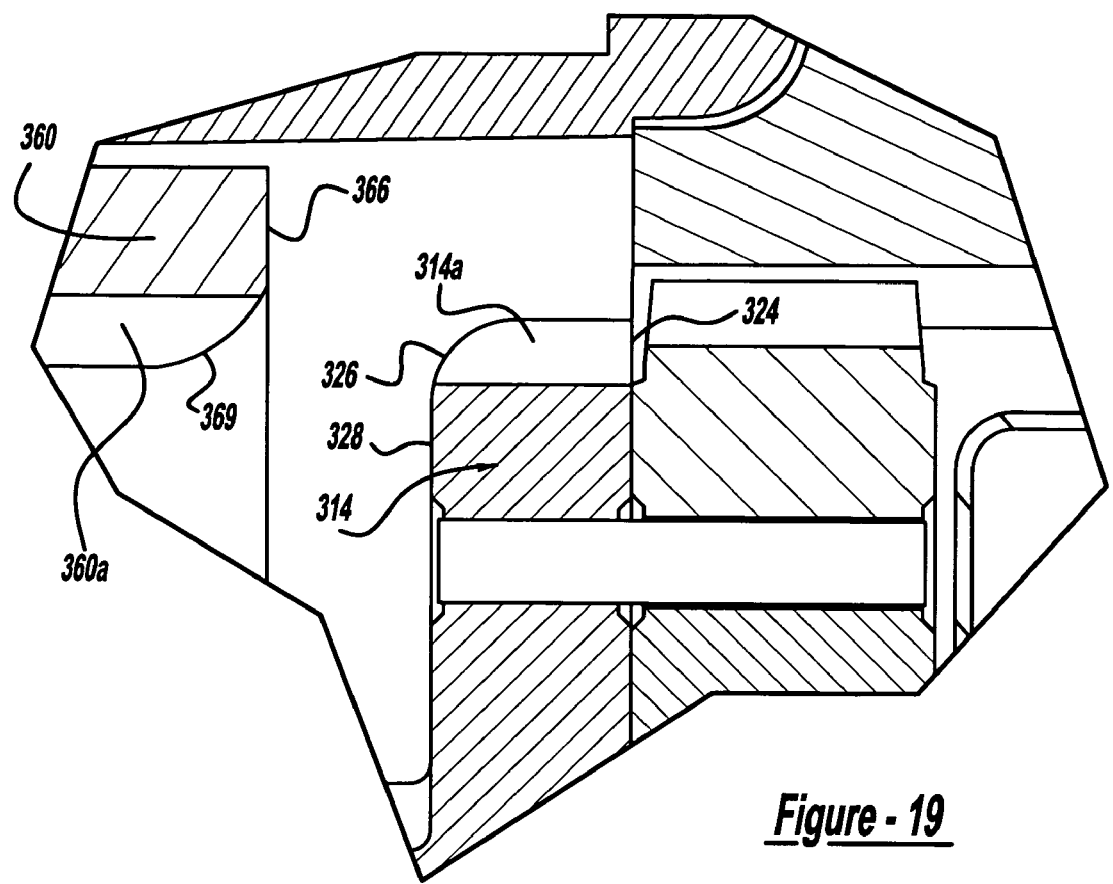
FIG. 19 is a sectional view taken along a longitudinal axis of the power tool of FIG. 1 illustrating a portion of the reduction gearset assembly in greater detail.
Figure 20:
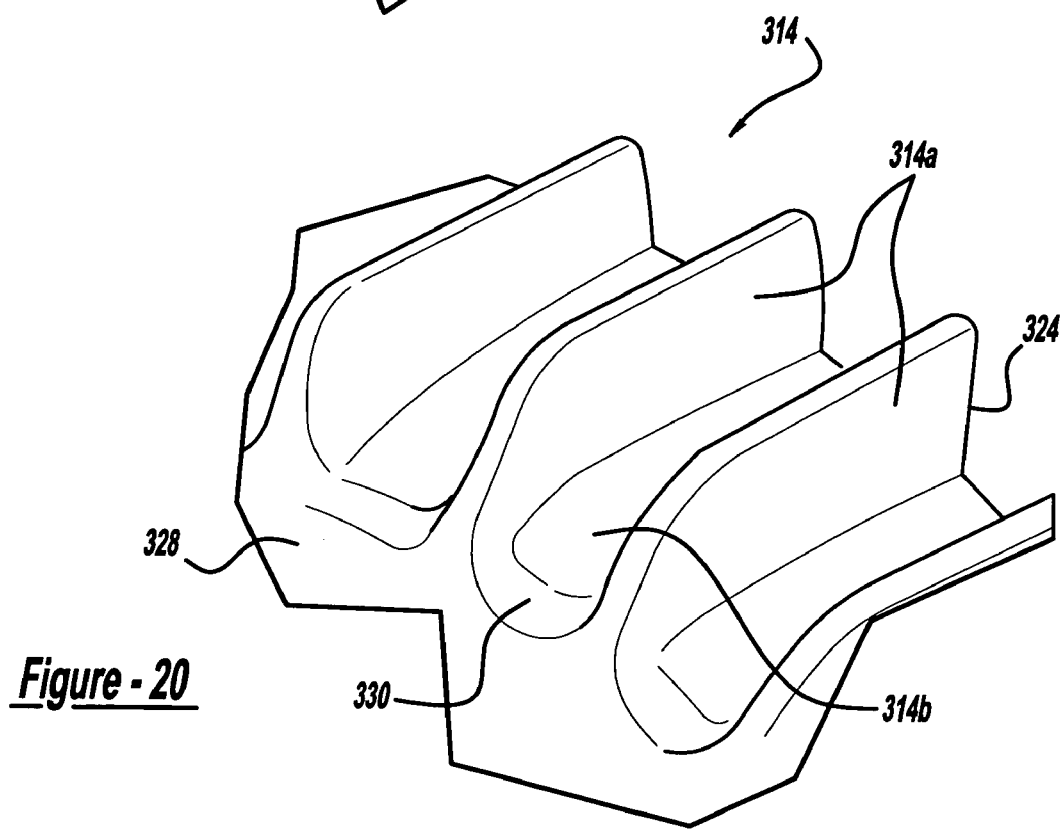
FIG. 20 is a front view of a portion of the first reduction carrier.

With specific reference to FIGS. 19 and 20, the profile of the gear teeth 314*a* is illustrated in greater detail. As shown, each gear tooth 314*a* terminates at a gradual radius 326 at the forward face 328 of the first reduction carrier 314 but terminates abruptly at the rearward face 324 of the first reduction carrier 314. A radius 330 is also formed on the valleys 314*b* between the gear teeth 314*a*.

Returning to FIGS. 12, 13, 15, 18 and 23, a first thrust washer 332 having a first annular portion 334, a second annular portion 336 and a plurality of retaining tabs 338 is positioned rearwardly of the first reduction gear set 302. The retaining tabs 338 engage the second grooves 232 in the base 216 of the transmission sleeve 200 and as such, relative rotation between the first thrust washer 332 and the transmission sleeve 200 is inhibited. The inside diameter of the base 216 is sized to receive the motor cover 136 and as such, the front face 340 of the motor cover 136 inhibits the axial movement of the first thrust washer 332. The first annular portion 334 contacts the rear face 342 of the first ring gear 310, providing a wear surface and controlling the amount by which the first ring gear 310 is able to move in an axial direction. The second annular portion 336 is spaced axially apart from the first annular portion 334, extending forwardly of the first annular portion 334 to provide a wear surface for the first set of planet gears 312 that also controls the amount by which they can move in an axial direction.

The first set of planet gears 312 includes a plurality of planet gears 344, each of which being generally cylindrical in shape, having a plurality of gear teeth 344a formed into its outer perimeter and a pin aperture 346 formed its their center. Each planet gear 344 is rotatably supported on an associated one of the pins 322 and the first reduction carrier 314 and is positioned such that its teeth 344a meshingly engage the teeth 310a of the first ring gear 310. A raised portion 348 is formed into the front and rear face 350 and 352 of each planet gear 344 that inhibits the teeth 344a from rubbing on the first reduction carrier 314 and the first thrust washer 332 and creating dust or chips that would impair the performance of the transmission assembly 16 and reduce its operating life. As the teeth 46a of the motor pinion 46 on the output shaft 44 are also meshingly engaged with the teeth 344a of the planet gears 344, the motor pinion 46 serves as a sun gear for the first reduction gear set 302.

The second reduction gear set 304 is disposed within the portion of the hollow cavity 212 defined by the first housing portion 260 and includes a second sun gear 358, a second reduction element or ring gear 360, a second set of planet gears 362 and a second reduction carrier 364. The second sun gear 358 is fixed for rotation with the first reduction carrier 314. The second sun gear 358 includes a plurality of gear teeth 358a that extend forwardly of the forward face 328 of the first reduction carrier 314.

The second ring gear 360 is an annular structure, having a plurality of gear teeth 360a formed along its interior diameter. The gear teeth 360a may be heavily chamfered at the rear face 366 of the second ring gear 360 but terminate abruptly at the front face 368. More preferably, a heavy radius 369 is formed onto the rear face 366 and the sides of each of the gear teeth 360a, with the heavy radius 369 being employed rather than the heavy chamfer as the heavy radius 369 on the gear teeth 360a provides for better engagement between the second ring gear 360 and the first reduction carrier 314.

A plurality of sleeve engagement teeth 370 are formed into the outer perimeter of the second ring gear 360; the sleeve engagement teeth 370 extend forwardly toward the front face 368 of the second ring gear 360 and terminate at a tip portion 372 that is rounded and tapers forwardly and inwardly. An annular clip groove 374 is also formed into the outer perimeter of the second ring gear 360. In the example illustrated, the clip groove 374 is a rectangular slot having a pair of sidewalls 376. The clip groove 374 will be discussed in greater detail, below.

The second reduction carrier 364 is formed in the shape of a flat cylinder, having plurality of pins 378 that extend from its rearward face 380. The second set of planet gears 362 is shown to include a plurality of planet gears 382. Each planet gear 382 is generally cylindrical in shape, having a plurality of gear teeth 382a formed into its outer perimeter and a pin aperture 384 formed its center. Each planet gear 382 is rotatably supported on an associated one of the pins 378 and the second reduction carrier 364 is positioned such that the gear teeth 382a of the planet gears 382 meshingly engage the gear teeth 360a of the second ring gear 360. The gear teeth 358a of the second sun gear 358 are also meshingly engaged with the gear teeth 382a of the planet gears 382.

The third reduction gear set 306 is disposed within the portion of the hollow cavity 212 defined by the second housing portion 262 and includes a third sun gear 398, a third reduction element or ring gear 400, a third set of planet gears 402 and a third reduction carrier 404. The third sun gear 398 is fixed for rotation with the second reduction carrier 364. The third sun gear 398 includes a plurality of gear teeth 398a that extend forwardly of the front face 406 of the second reduction carrier 364.

The third ring gear 400 is an annular structure, having a plurality of gear teeth 400a formed along its interior diameter. The gear teeth 400a may be heavily chamfered at the front face 412 of the third ring gear 400, but terminate abruptly at the rear face 414. More preferably, a heavy radius 407 is formed onto the front face 412 and the sides of each of the gear teeth 400a, with the heavy radius 407 being employed rather than the heavy chamfer as the heavy radius 407 on the gear teeth 400a provides for better engagement between the third ring gear 400 and the third reduction carrier 404. A plurality of sleeve engagement teeth 418 are formed into the outer perimeter of the third ring gear 400; the sleeve engagement teeth 418 extend rearward toward the rear face 414 of the third ring gear 400 and terminate at a tip portion 420 that is rounded and tapers rearwardly and inwardly. An annular clip groove 422 is also formed into the outer perimeter of the third ring gear 400. In the example illustrated, the clip groove 422 is a rectangular slot having a pair of sidewalls 424. The clip groove 422 will be discussed in greater detail, below.

The third reduction carrier 404 is formed in the shape of a flat cylinder, having plurality of pins 428 that extend from its rearward face 430. A plurality of gear teeth 404a are formed into almost the entire outer perimeter of the third reduction carrier 404, with a valley 404b being formed between each pair of adjacent teeth 404a. Due to the spacing of the teeth 404a, one of the valleys 404b (i.e., valley 404b') is relatively larger than the remaining valleys 404b due to the omission of a tooth 404a in the outer perimeter of the third reduction carrier 404. In the particular embodiment illustrated, the gear teeth 404a of the third reduction carrier 404 are configured so as not to be meshingly engagable with the gear teeth 382a of the second planet gears 382.

Figure 21:
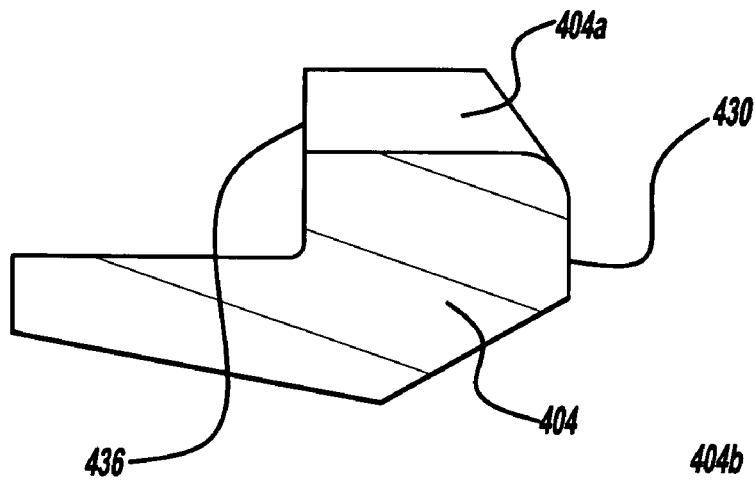
FIG. 21 is a sectional view taken along a longitudinal axis of the power tool of FIG. 1 illustrating a portion of the reduction gearset assembly in greater detail.
Figure 22:
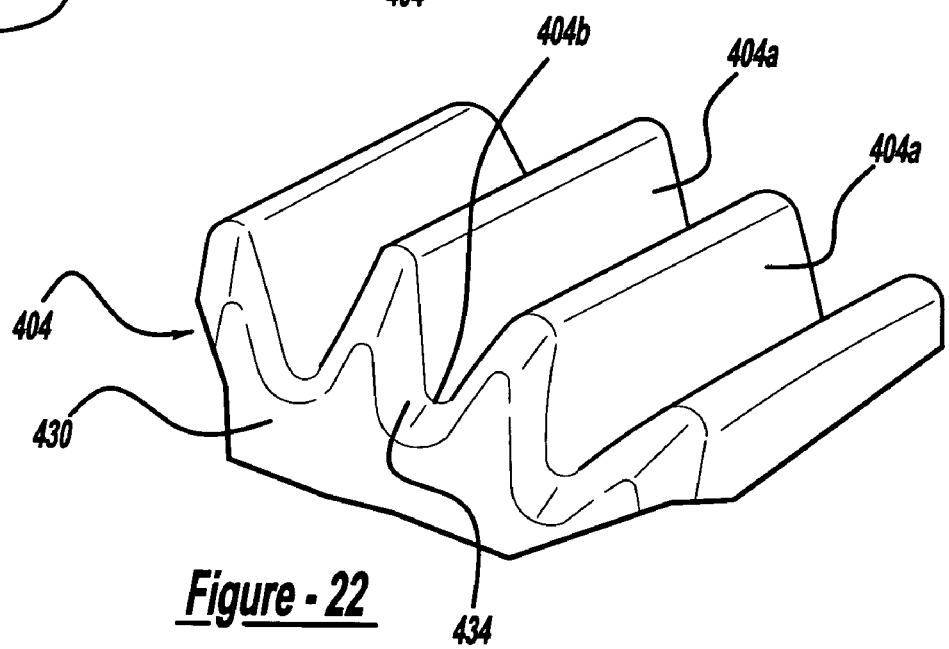
FIG. 22 is a rear view of a portion of the third reduction carrier.

With brief additional reference to FIGS. 21 and 22, the profile of the gear teeth 404a is illustrated in greater detail. As shown, the rear face 430 of the third reduction carrier 404 is chamfered and a heavy radius 434 is formed into each of sides of the teeth 404a and valleys 404b. Each gear tooth 404a terminates abruptly at the forward face 436 of the third reduction carrier 404.

Returning back to FIGS. 12, 13, 15, 18 and 23, the third set of planet gears 402 is shown to include a plurality of planet gears 438. Each planet gear 438 is generally cylindrical in shape, having a plurality of gear teeth 438a formed into its outer perimeter and a pin aperture 440 formed through its center. Each planet gear 438 is rotatably supported on an associated one of the pins 428 and the third reduction carrier 404 is positioned such that the gear teeth 438a of the planet gears 438 meshingly engage the gear teeth 400a of the third ring gear 400. A raised portion 442 is formed into each of the front and rear faces of the planet gears 438 which inhibits the gear teeth 438a from rubbing on the third reduction carrier 404 and creating dust or chips that would impair the performance of the transmission assembly 12 and reduce its operating life. A second thrust washer 450 is disposed around the third sun gear 398 and the teeth 398a of the third sun gear 398 are meshingly engaged with the gear teeth 438a of the planet gears 438. The second thrust washer 450 includes a plurality of retaining tabs 452 that are configured to engage corresponding tab grooves 454 (FIG. 13) that are formed in the inner surface 266 of body portion 246 of the transmission sleeve 200. The retaining tabs 452 and the tab grooves 454 cooperate to inhibit relative rotation between the second thrust washer 450 and the transmission sleeve 200.

The output spindle assembly 20 includes a transmitting means 458 for coupling a spindle 460 for rotation with the third reduction carrier 404 so as to transmit drive torque from the reduction gearset assembly 202 to the chuck 22. Such transmitting means 458 are well known in the art and easily adapted to the transmission assembly of the present invention. Accordingly, a detailed discussion of the transmitting means 458 need not be included herein.

With reference to FIGS. 13, 13a, 13b, 16, 17, 18 and 23 through 28, the speed selector mechanism 60 is movable between a first position 500, a second position 502 and a third position 504 and includes a switch portion 510 for receiving a speed change input and an actuator portion 512 for manipulating the reduction gearset assembly 202 in accordance with the speed change input. The actuator portion 512 is operatively coupled to the reduction gearset assembly 202 and moves the second and third reduction gear sets 304 and 306 between the active and inactive modes in response to movement of the switch portion 510 between the first, second and third positions 500, 502 and 504. In the particular embodiment illustrated, the actuator portion 512 includes a rotary selector cam 520, a plurality of wire clips 522 and a spring member 523. Each of the wire clips 522 is formed from a round wire which is bent in the shape of a semi-circle 524 with a pair of tabs 526 extending outwardly from the semi-circle 524 and positioned on about the centerline of the semi-circle 524. The semi-circle 524 is sized to fit within the clip grooves 374 and 422 in the second and third ring gears 360 and 400, respectively. In this regard, the semi-circle 524 neither extends radially outwardly of an associated one of the ring gears (360, 400), nor binds against the sidewalls (376, 424) of the clip grooves (374, 422). In the example provided, the sidewalls (376, 424) of the clip grooves (374, 422) are spaced apart about 0.05 inch and the diameter of the wire forming the wire clips 522 is about 0.04 inch.

The tabs 526 of the wire clips 522 extend outwardly of the hollow cavity 212 into an associated one of the clip slots (284, 286) that is formed into the transmission sleeve 200. The tabs 526 are long enough so that they extend outwardly of the outer surface 258 of the body 214 of the transmission sleeve 200, but not so far as to extend radially outwardly of the portion of the first clip slots 284 in the base 216 of the transmission sleeve 200. Configuration of the wire clips 522 in this manner facilitates the assembly of the transmission assembly 16, permitting the wire clips 522 to be installed to the second and third ring gears 360 and 400, after which these assemblies are inserted into the hollow cavity 212 along the longitudinal axis of the transmission sleeve 200.

With specific reference to FIGS. 13 and 27a through 27c, the rotary selector cam 520 is illustrated to include an arcuate selector body 530, a switch tab 532 and a plurality of spacing members 534. A pair of first cam slots 540a and 540b, a pair of second cam slots 544a and 544b, a spring aperture 546 and a guide aperture 548 are formed through the selector body 530. The selector body 530 is sized to engage the outside diameter of the body portion 246 of the transmission sleeve 200 in a slip-fit manner. The guide aperture 548 is generally rectangular in shape and sized to engage the front and rear surfaces of the selector cam guide 250. The guide aperture 548 is considerably wider than the width of the selector cam guide 250, being sized in this manner to permit the rotary selector cam 520 to be rotated on the transmission sleeve 200 between a first rotational position, a second rotational position and a third rotational position. The selector cam guide 250 and cooperates with the guide aperture 548 to limit the amount by which the rotary selector cam 520 can be rotated on the transmission sleeve 200, with a first lateral side of the selector cam guide 250 contacting a first lateral side of the guide aperture 548 when the rotary selector cam 520 is positioned in the first rotational position, and a second lateral side of the selector cam guide 250 contacting a second lateral side of the guide aperture 548 when the rotary selector cam 520 is positioned in the third rotational position.

Each of the first cam slots 540a and 540b is sized to receive one of the tabs 526 of the wire clip 522 that is engaged to the second ring gear 360. In the particular embodiment illustrated, first cam slot 540a includes a first segment 550, a second segment 552 and an intermediate segment 554. The first segment 550 is located a first predetermined distance away from a reference plane 558 that is perpendicular to the longitudinal axis of the rotary selector cam 520 and the second segment 552 is located a second distance away from the reference plane 558. The intermediate segment 554 couples the first and second segments 550 and 552 to one another. The configuration of first cam slot 540b is identical to that of first cam slot 540a, except that it is rotated relative to the rotary selector cam 520 such that each of the first, second and intermediate segments 550, 552 and 554 in the first cam slot 540b are located 180° apart from the first, second and intermediate segments 550, 552 and 554 in the first cam slot 540a.

Each of the second cam slots 544a and 544b is sized to receive one of the tabs 526 of a corresponding one of the wire clips 522. In the particular embodiment illustrated, second cam slot 544a includes a first segment 560, a second segment 562, a third segment 564 and a pair of intermediate segments 566 and 568. The first and third segments 560 and 564 are located a third predetermined distance away from the reference plane and the second segment 562 is located a fourth distance away from the reference plane 558. The intermediate segment 566a couples the first and second segments 560 and 562 to one another and the intermediate segment 568 couples the second and third segments 562 and 564 together. The configuration of second cam slot 544b is identical to that of second cam slot 544a, except that it is rotated relative to the rotary selector cam 520 such that each of the first, second, third and intermediate segments 560, 562, 564 and 566 and 568 in the second cam slot 544b are located 1800 apart from the first, second, third and intermediate segments 560, 562, 564 and 566 and 568 in the second cam slot 544a.

With the tabs 526 of the wire clips 522 engaged to the first cam slots 540a and 540b and the second cam slots 544a and 544b, the rotary selector cam 520 may be rotated on the transmission sleeve 200 between the first, second and third positions 500, 502 and 504 to selectively engage and disengage the second and third ring gears 360 and 400 from the first and third reduction carriers 314 and 404, respectively. During the rotation of the rotary selector cam 520, the first cam slots 540a and 540b and the second cam slots 544a and 544b confine the wire tabs 526 of their associated wire clip 522 and cause the wire tabs 526 to travel along the longitudinal axis of the transmission sleeve 200 in an associated one of the first and second clip slots 284 and 286. Accordingly, the rotary selector cam 520 is operative for converting a rotational input to an axial output that causes the wire clips 522 to move axially in a predetermined manner. A lubricant (not specifically shown) is applied to the lubricant grooves 252 formed into body portion 246 of the transmission sleeve 200 is employed to lubricate the interface between the transmission sleeve 200 and the rotary selector cam 520.

Figure 23:
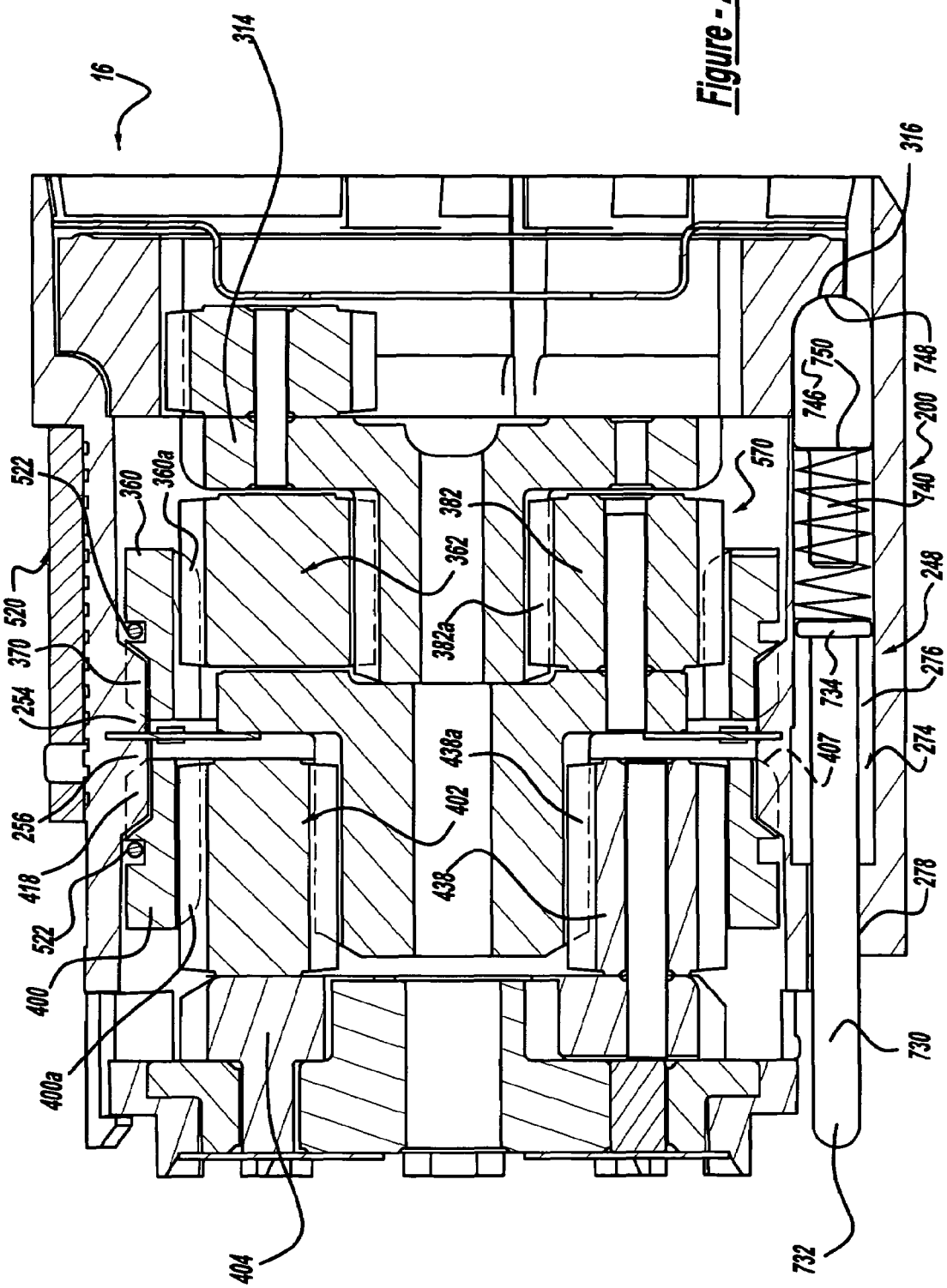
FIG. 23 is an sectional view taken along the longitudinal axis of the power tool of FIG. 1 and illustrating the transmission assembly as positioned in the first speed ratio.

Positioning the rotary selector cam 520 in the first rotational position 500 causes the tabs 526 of the wire clip 522 that is engaged to the second ring gear 360 to be positioned in the first segment 550 of the first cam slots 540a and 540b and the tabs 526 of the wire clip 522 that is engaged to the third ring gear 400 to be positioned in the first segment 560 of the second cam slots 544a and 544b. Accordingly, positioning of the rotary selector cam 520 in the first rotational position causes the second and third ring gears 360 and 400 to be positioned in meshing engagement with the second and third planet gears 362 and 402, respectively. Simultaneously with the meshing engagement of the second and third ring gears 360 and 400 with the second and third planet gears 362 and 402, the sleeve engagement teeth 370 and 418 of the second and third ring gears 360 and 400, respectively, are positioned in meshing engagement with the first and second sets of ring engagement teeth 254 and 256, respectively, to inhibit relative rotation between the second and third ring gears 360 and 400 and the transmission sleeve 200 to thereby provide the transmission assembly 16 with a first overall gear reduction or speed ratio 570 as shown in FIG. 23. Those skilled in the art will understand that the tip portion 272 of the teeth 268 of the first and second sets of ring engagement teeth 254 and 256 and the tip portions 372 and 420 of the sleeve engagement teeth 370 and 418, respectively, are rounded and tapered so as to improve their capability for meshing engagement in response to axial repositioning along a longitudinal axis of the transmission assembly 16.

Figure 24:
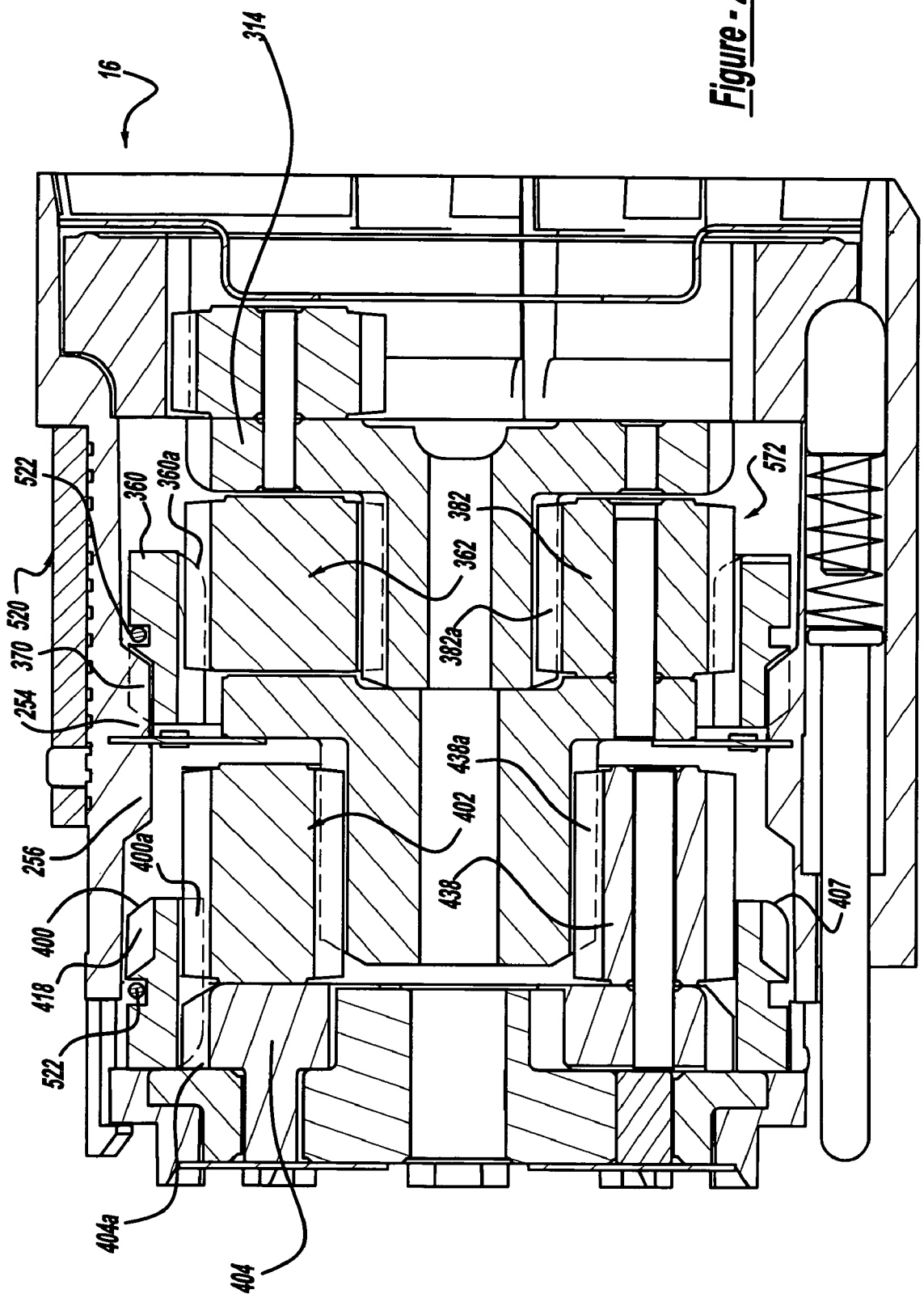
FIG. 24 is a sectional view similar to that of FIG. 23 but illustrating the transmission assembly as positioned in the second speed ratio.
Figure 25:
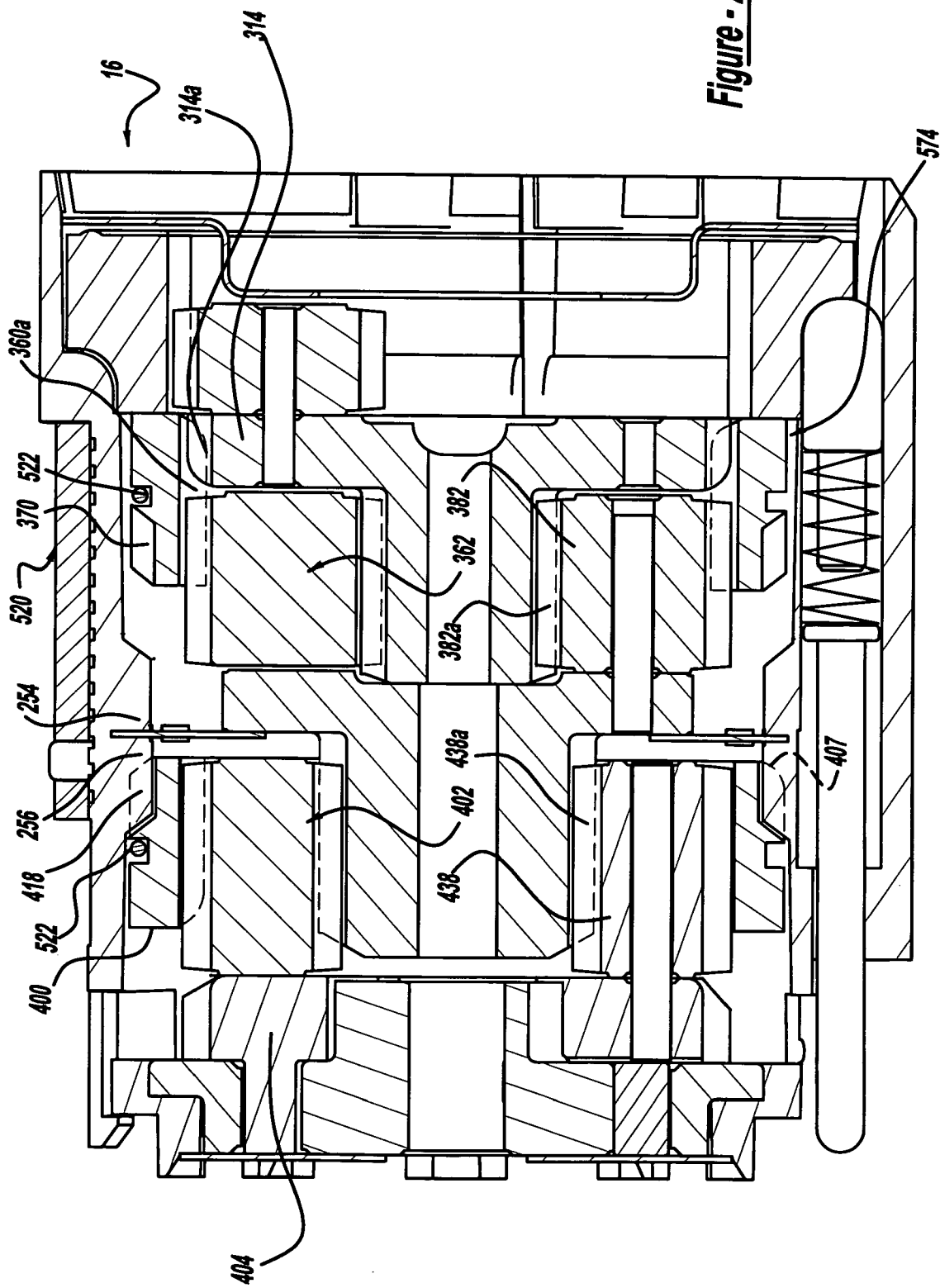
FIG. 25 is a sectional view similar to that of FIG. 23 but illustrating the transmission assembly as positioned in the third speed ratio.
Figure 26:
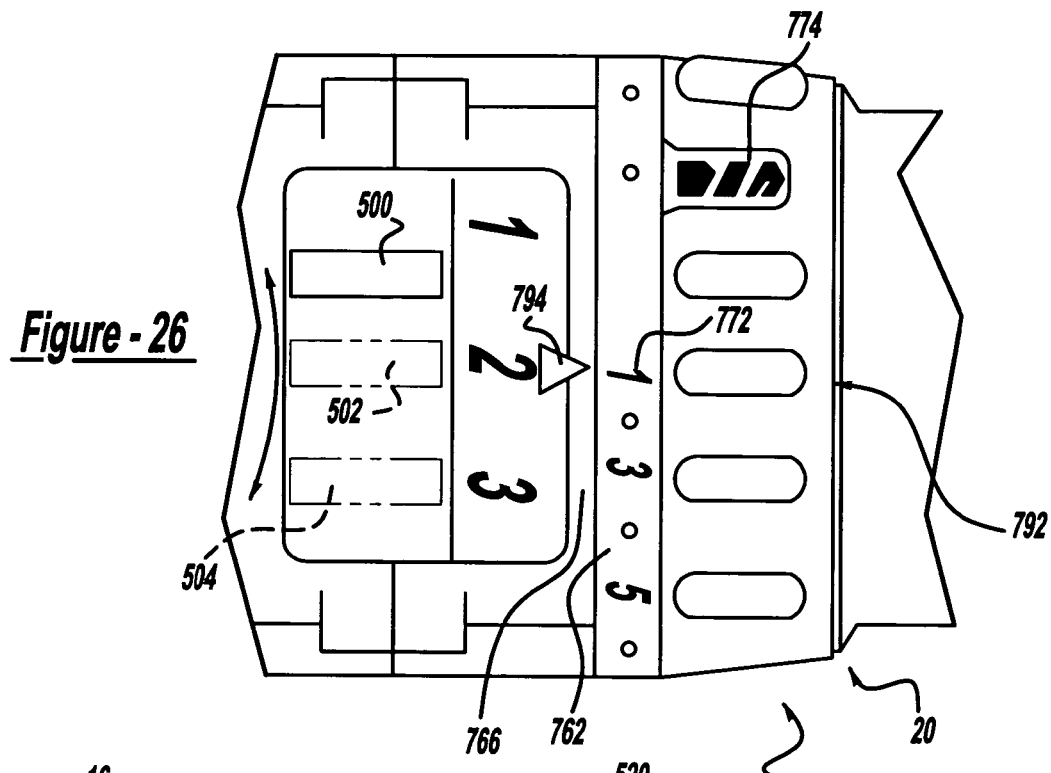
FIG. 26 is a top view of a portion of the power tool of FIG. 1 illustrating the speed selector mechanism in greater detail.

Positioning the rotary selector cam 520 in the second rotational position 502 causes the tabs 526 of the wire clip 522 that is engaged to the second ring gear 360 to be positioned in the first segment 550 of the first cam slots 540a and 540b and the tabs 526 of the wire clip 522 that is engaged to the third ring gear 400 to be positioned in the second segment 562 of the second cam slots 544a and 544b. Accordingly, positioning of the rotary selector cam 520 in second rotational position causes the second ring gear 360 to be in meshing engagement with the second planet gears 362 and the third ring gear 400 to be in meshing engagement with both the third planet gears 402 and the third reduction carrier 404. Positioning of the rotary selector cam 520 in the second rotational position 502 also positions the sleeve engagement teeth 370 of the second ring gear 360 in meshing engagement with the first set of ring engagement teeth 254 while the sleeve engagement teeth 418 of the third ring gear 400 are not meshingly engaged with the second set of ring engagement teeth 256. As such, relative rotation between the second ring gear 360 and the transmission sleeve 200 is inhibited, while relative rotation between the third ring gear 400 and the transmission sleeve 200 is permitted to thereby provide the transmission assembly 16 with a second overall gear reduction or speed ratio 572 as illustrated in FIG. 24.

Positioning the rotary selector cam 520 in the third rotational position 504 causes the tabs 526 of the wire clip 522 that is engaged to the second ring gear 360 to be positioned in the second segment 552 of the first cam slots 540a and 540b and the tabs 526 of the wire clip 522 that is engaged to the third ring gear 400 to be positioned in the third segment 564 of the second cam slots 544a and 544b. Accordingly, positioning of the rotary selector cam 520 in the third rotational position 504 causes the second ring gear 360 to be in meshing engagement with both the second planet gears 362 and the first reduction carrier 314 while the third ring gear 400 is in meshing engagement with only the third planet gears 402. Positioning the rotary selector cam 520 in the third rotational position 504 also positions the sleeve engagement teeth 370 on the second ring gear 360 out of meshing engagement with the first set of ring engagement teeth 254 and the sleeve engagement teeth 418 on the third ring gear 400 in meshing engagement with the second set of ring engagement teeth 256 to permit relative rotation between the second ring gear 360 and the transmission sleeve 200 and inhibit relative rotation between the third ring gear 400 and the transmission sleeve 200 to provide the transmission assembly 16 with a third overall gear reduction or speed ratio 574.

Figure 13:
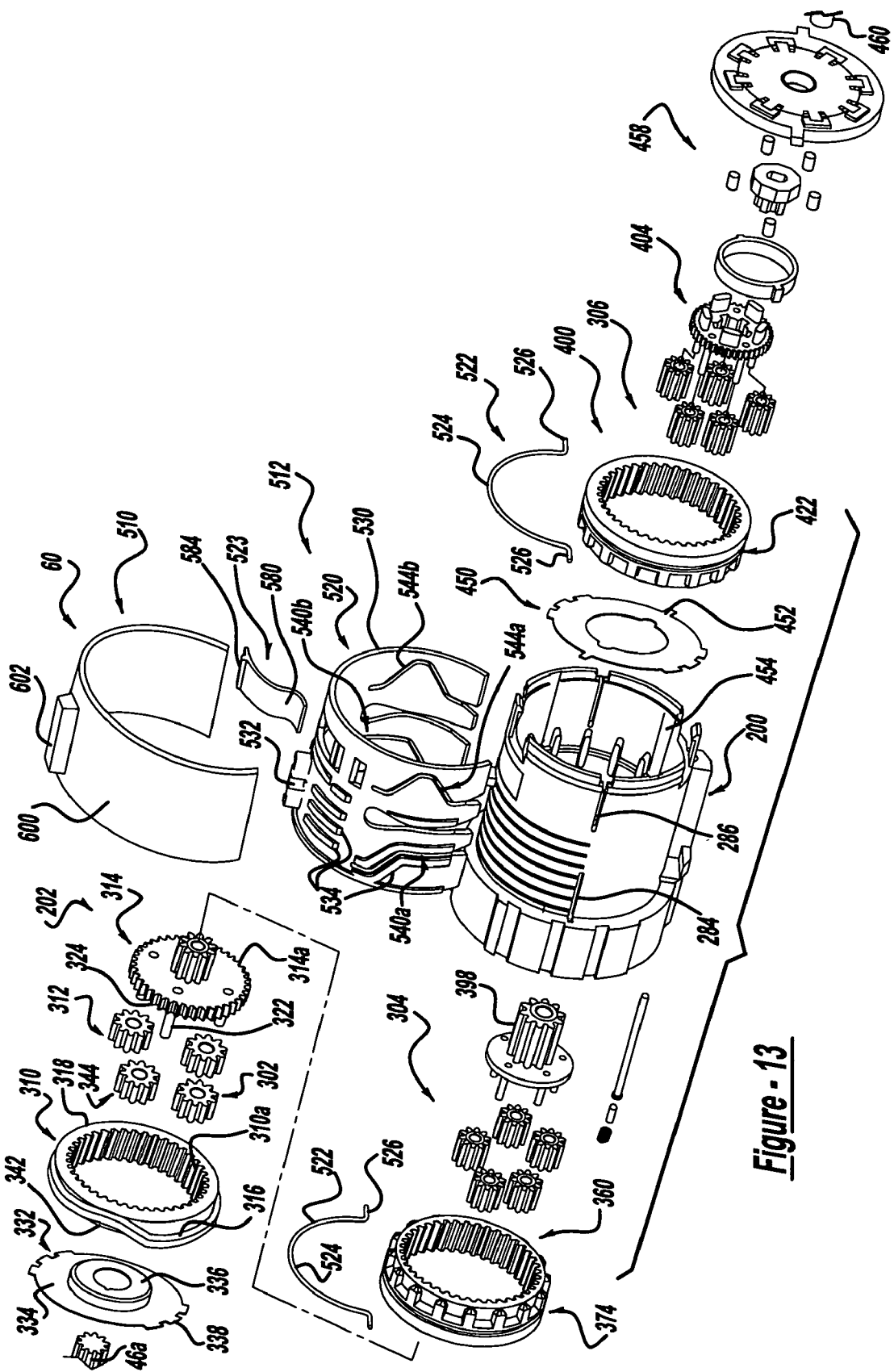
FIG. 13 is an exploded perspective view of a portion of the power tool of FIG. 1, illustrating the reduction gearset assembly, the transmission sleeve, a portion of the housing and a portion of the clutch mechanism in greater detail.
Figure 13A:
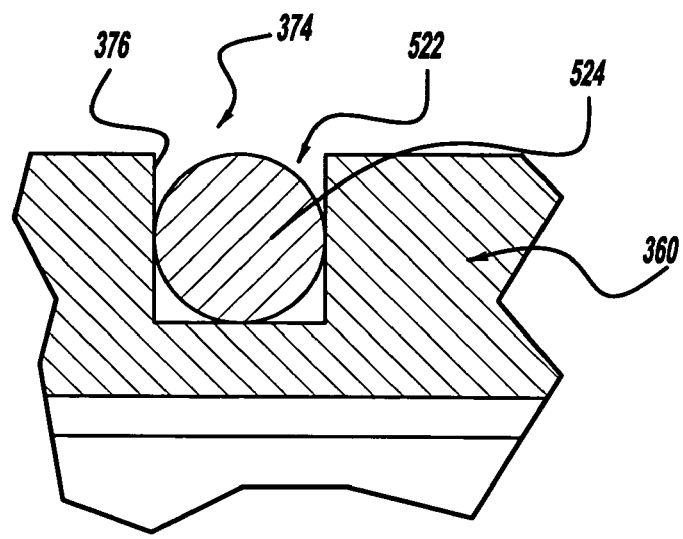
FIG. 13a is a sectional view taken along a longitudinal axis of the second ring gear.
Figure 13B:
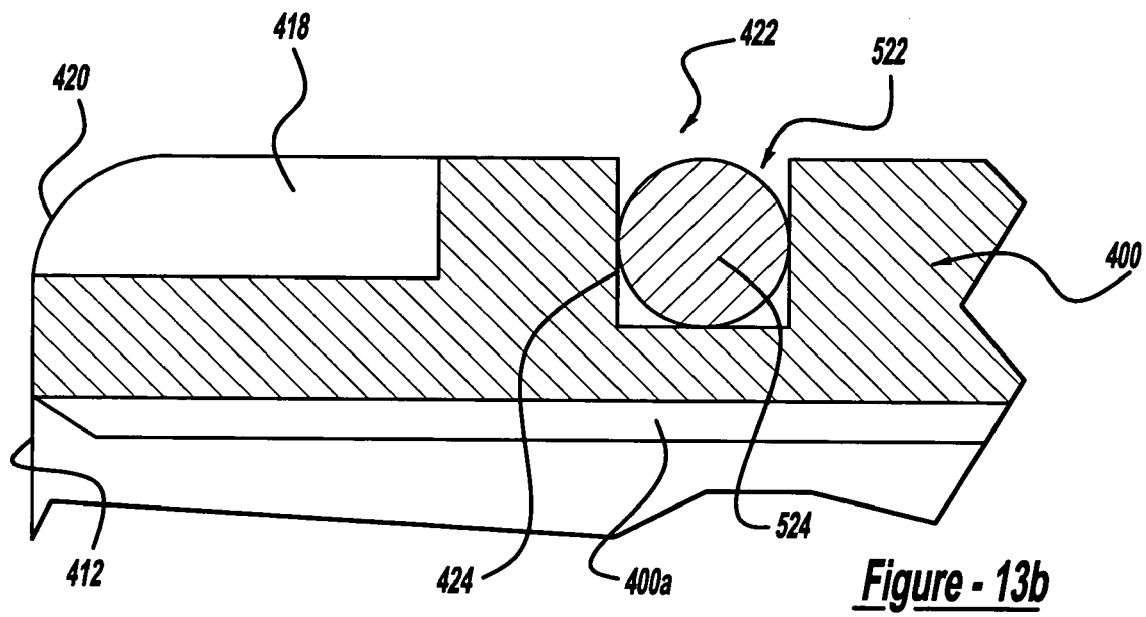
FIG. 13b is a sectional view taken along a longitudinal axis of the third ring gear.
Figure 14:
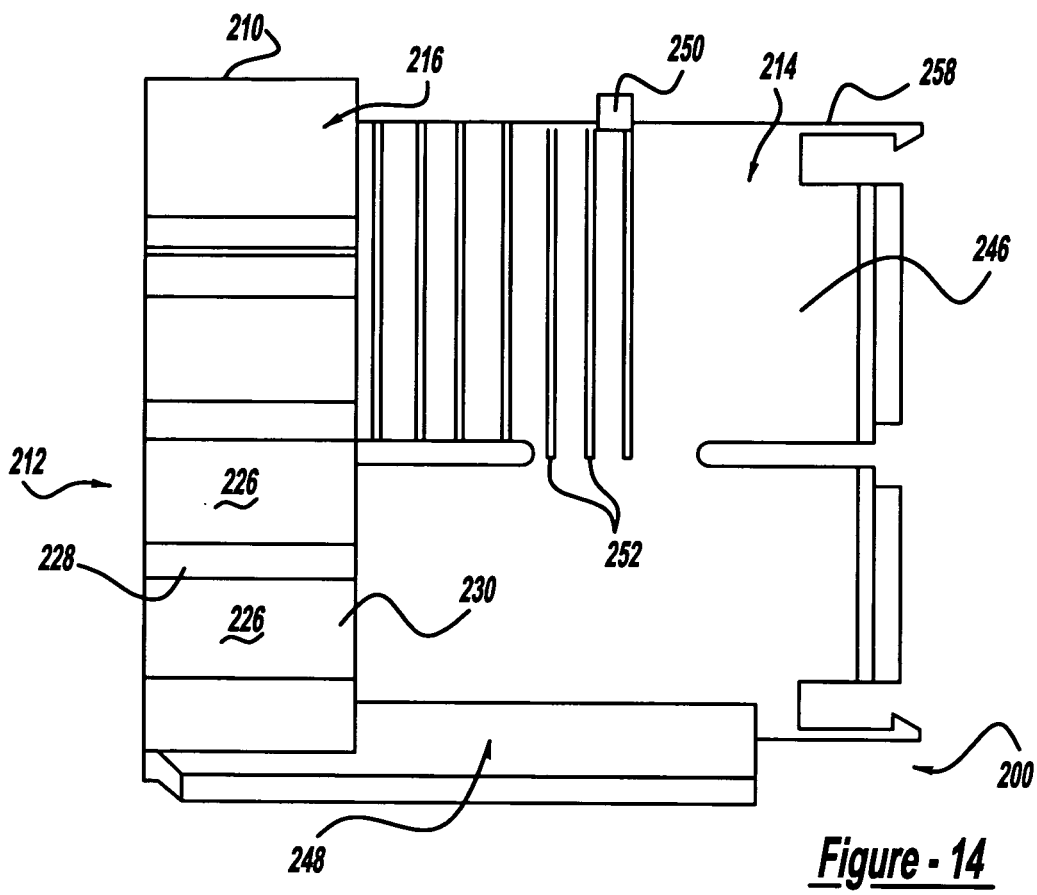
FIG. 14 is a side view of the transmission sleeve.
Figure 15:
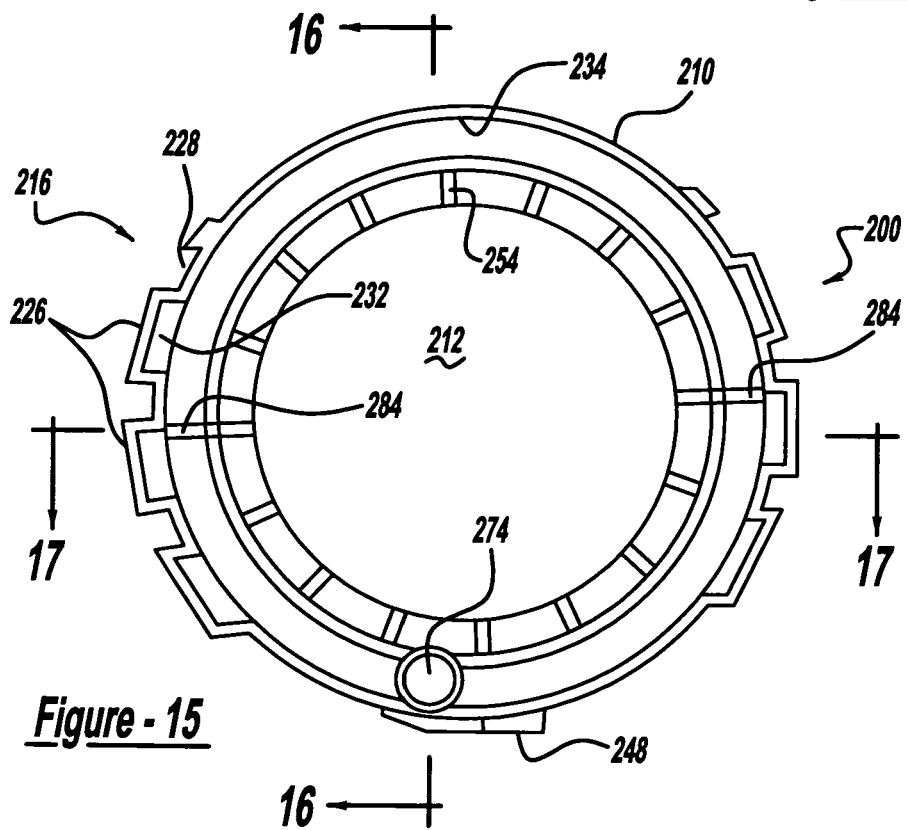
FIG. 15 is a rear view of the transmission sleeve.
Figure 16:
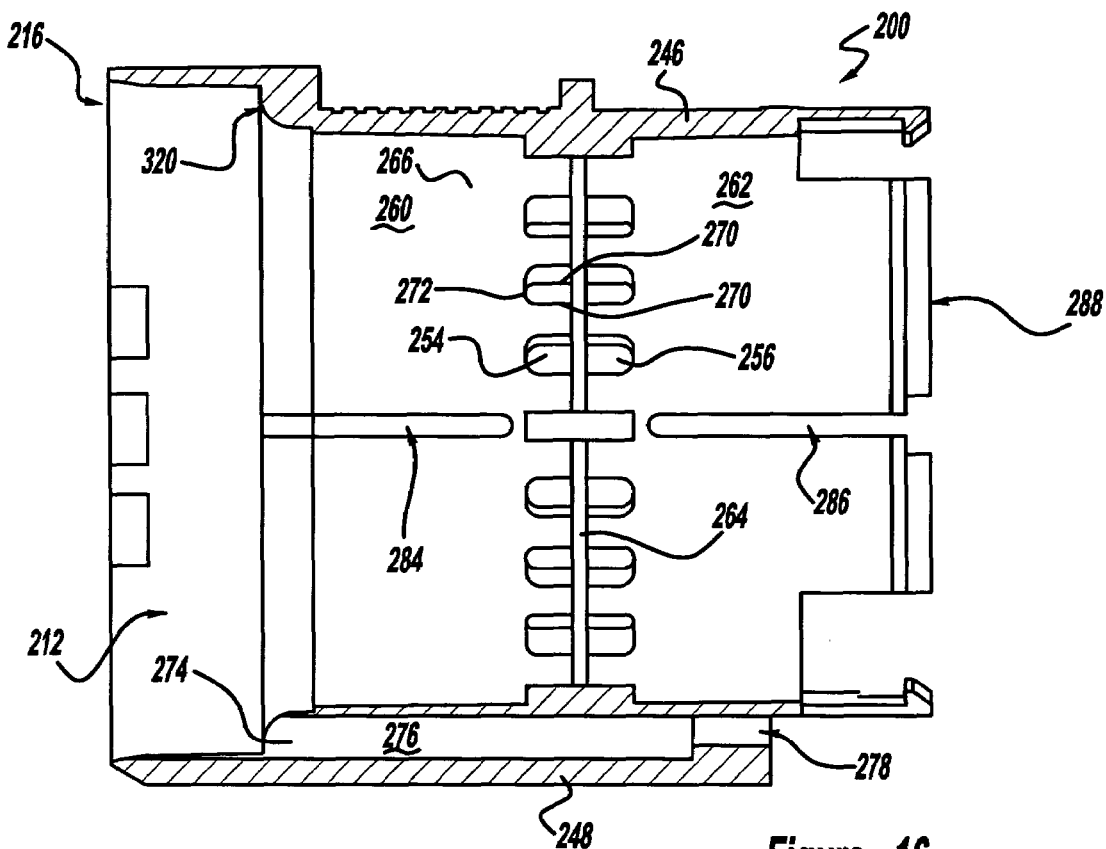
FIG. 16 is a sectional view taken along the line 16—16 of FIG. 15.
Figure 17:
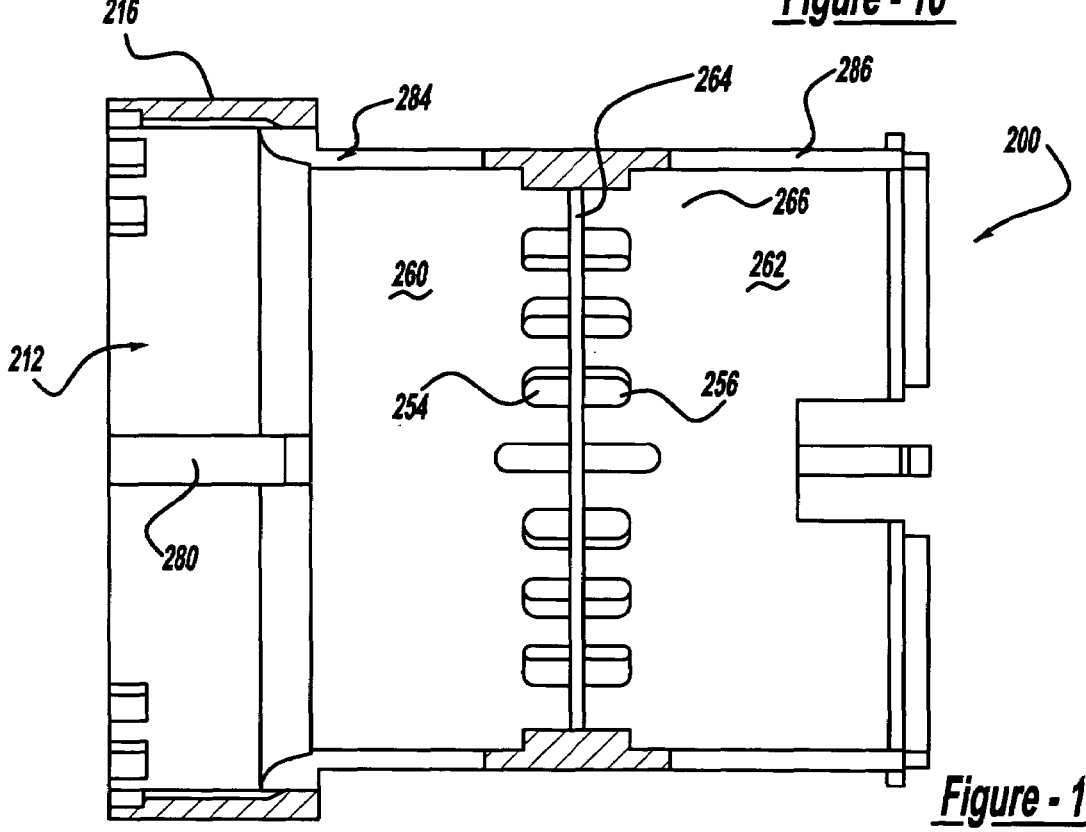
FIG. 17 is a sectional view taken along the line 17—17 of FIG. 15.
Figure 18:
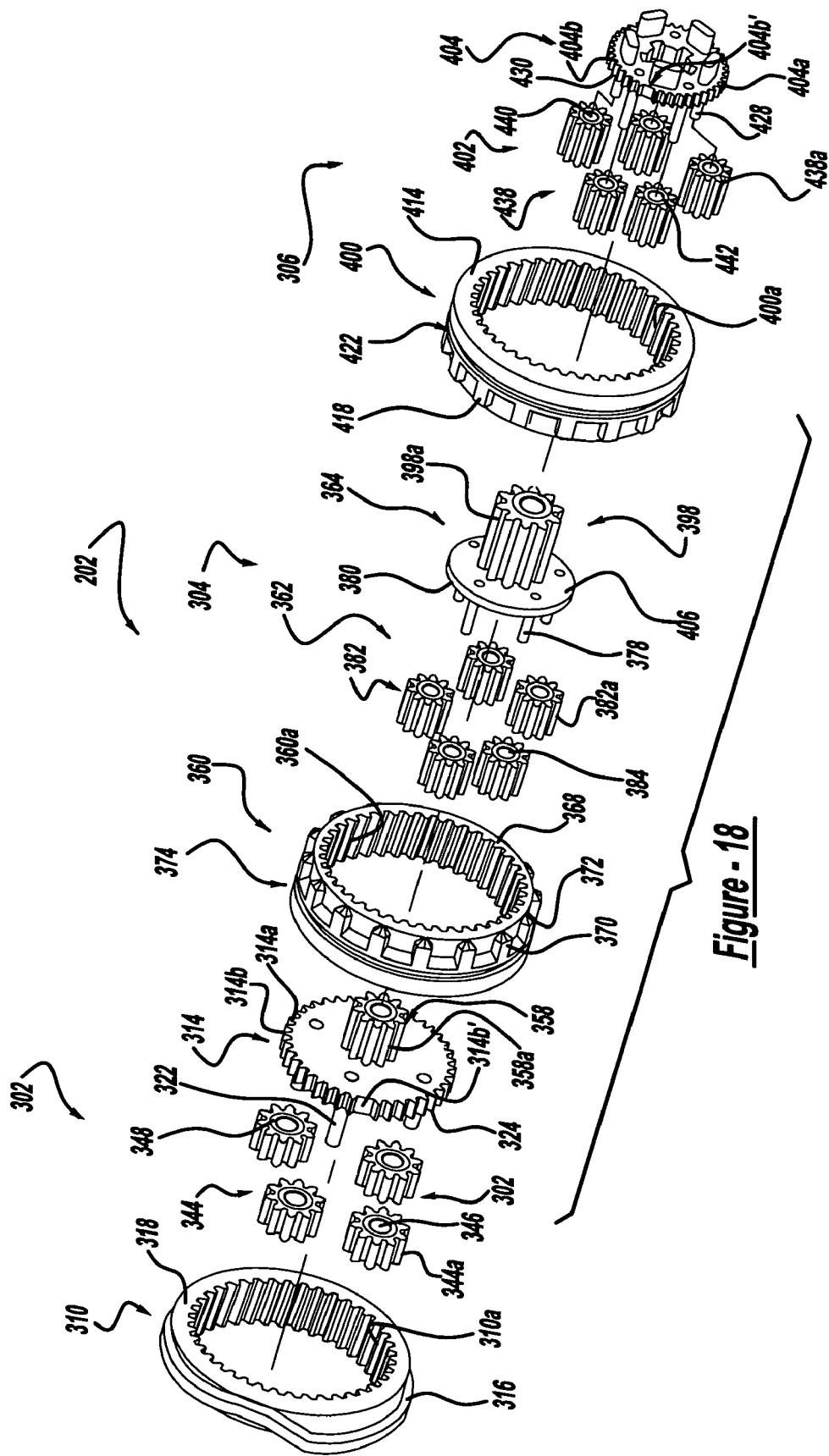
FIG. 18 is an exploded view of the reduction gearset assembly.
Figure 27A:
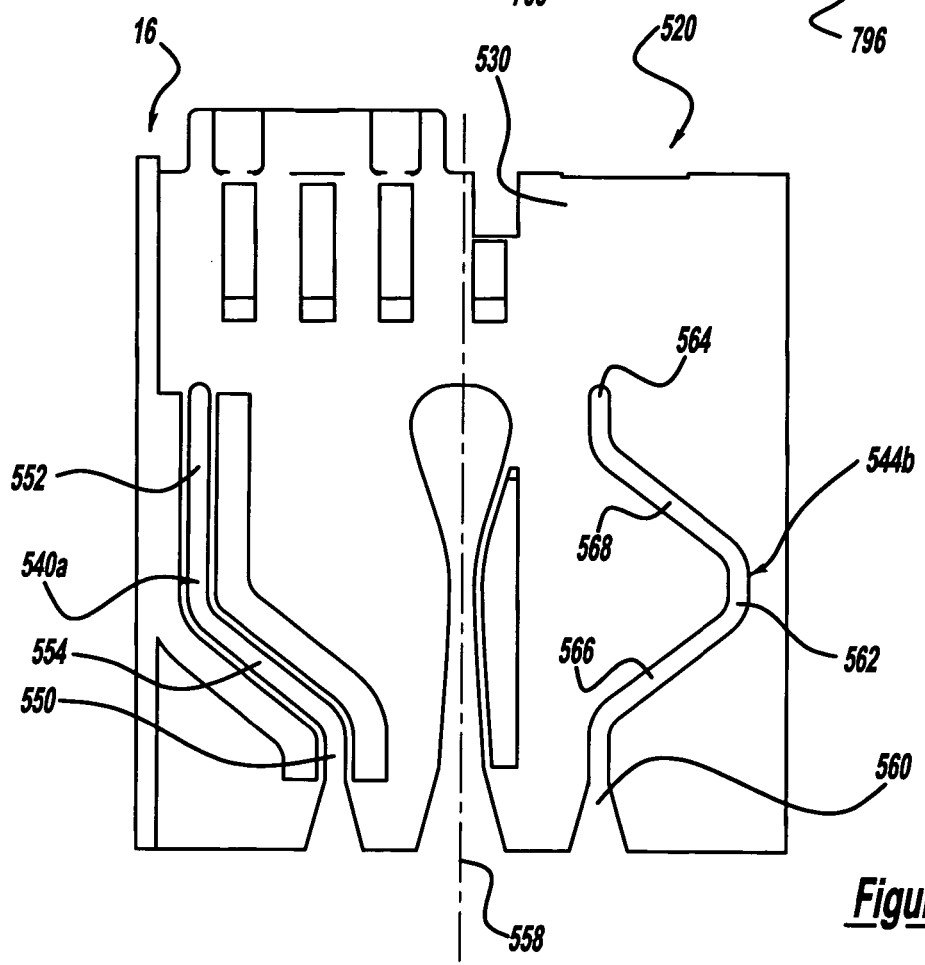
FIG. 27a is a side view of the rotary selector cam.
Figure 27B:
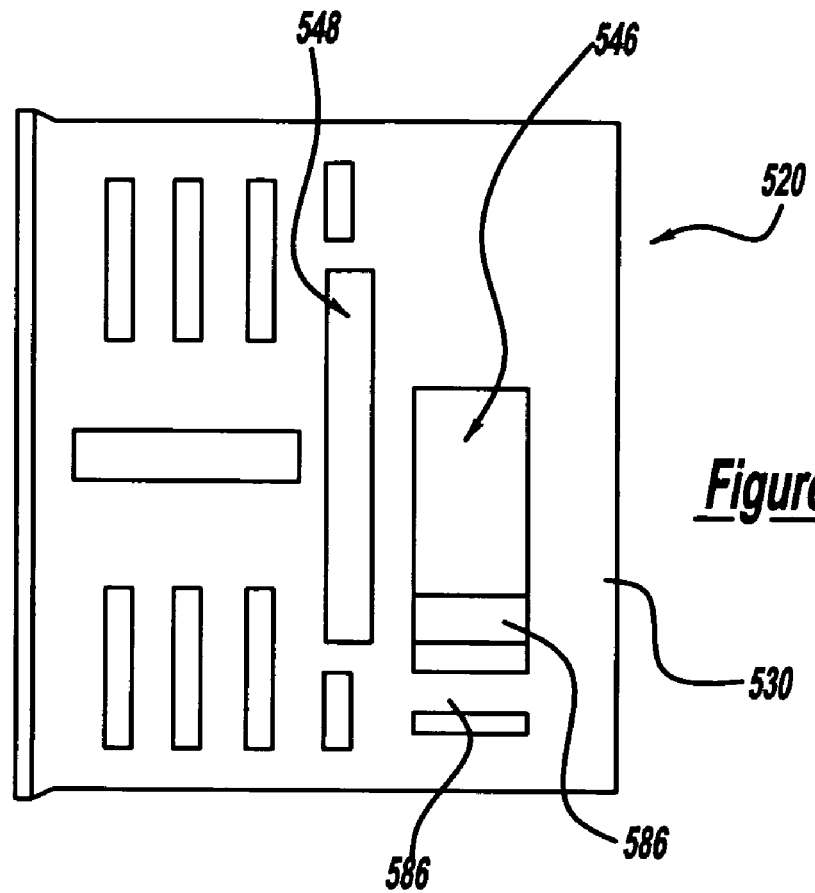
FIG. 27b is a top view of the rotary selector cam.
Figure 28:
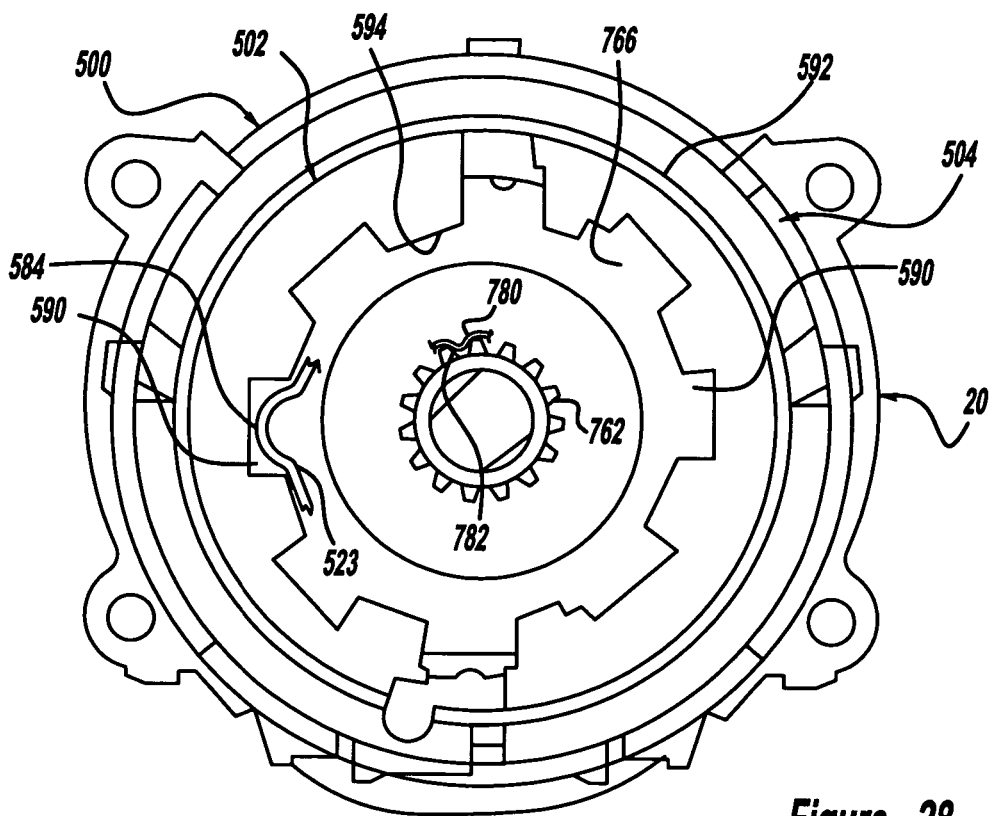
FIG. 28 is a rear view of the output spindle assembly.

In the example shown in FIGS. 13, 27b and 28, the spring member 523 is formed from a flat rectangular piece of spring steel and includes a flattened Z-shaped portion 580 and a raised portion 584. The flattened Z-shaped portion 580 is configured to wrap around two reinforcement bars 586 that extend into the spring aperture 546, thereby permitting the raised portion 584 to be maintained at a predetermined position and also to transmit a spring force between the rotary selector cam 520 and the spring member 523. With additional reference to FIG. 28, the raised portion 584 of the spring member 523 is sized to engage internal notches 590 formed in the housing 592 of the output spindle assembly 20. Lands 594 that are circumferentially spaced from the rotary selector cam 520 are formed between the notches 590. When the output spindle assembly 20 is positioned over the transmission assembly 16 and the speed selector mechanism 60 is positioned in one of the first, second and third rotational positions 500, 502 and 504, the raised portion 584 of the spring member 523 engages an associated one of the notches 590. The force that is generated by the spring member 523 when the raised portion 584 is moved downwardly toward the rotary selector cam 520 in response to contact between the raised portion 584 and the land 594 acts to inhibit unintended rotation of the speed selector mechanism 60. Furthermore, placement of the raised portion 584 in a notch 590 provides the user with a tactile indication of the positioning of the rotary selector cam 520.

Figure 27C:
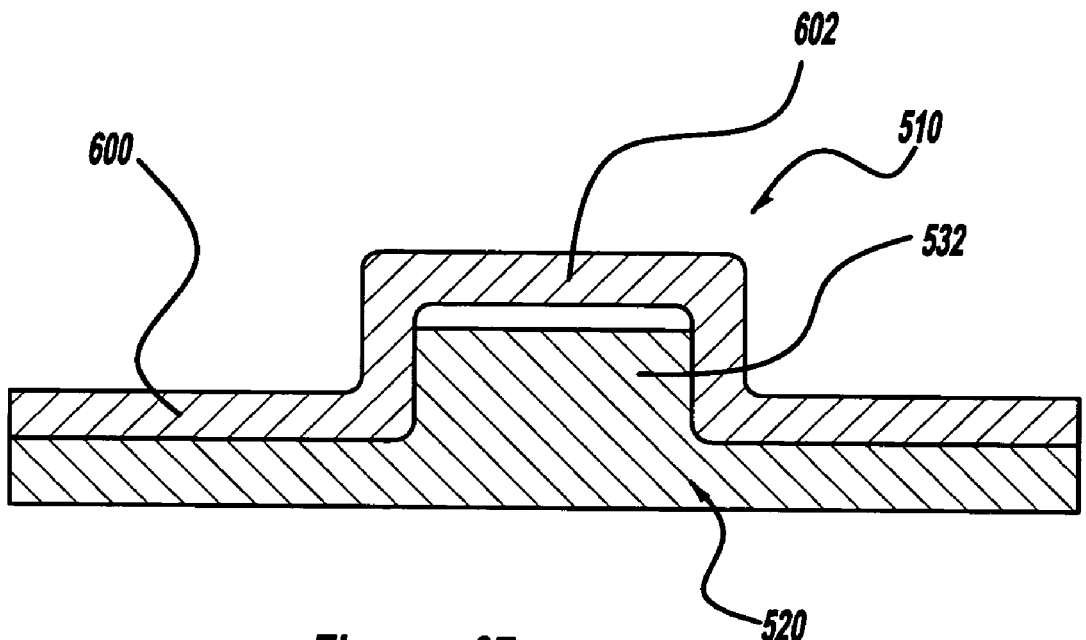
FIG. 27c is a sectional view taken through along the central axis of the speed selector mechanism.

In the particular embodiment illustrated in FIGS. 13 and 27c, switch portion 510 is shown to include an arcuate band 600 having a raised hollow and rectangular selector button 602 formed therein. The arcuate band 600 is formed from a plastic material and is configured to conform to the outer diameter of the rotary selector cam 520. The open end of the selector button 602 is configured to receive the switch tab 532, thereby permitting the switch portion 510 and the rotary selector cam 520 to be coupled to one another in a fastenerless manner. The plurality of spacing members 534 are raised portions formed into the rotary selector cam 520 that are concentric to and extend radially outwardly from the selector body 530. The spacing members 534 elevate the arcuate band 600 to prevent the arcuate band from contacting the wire tabs 526 in the first cam slots 540a and 540b. The spacing members 534 may also be employed to selectively strengthen areas of the rotary selector cam 520, such as in the areas adjacent the first cam slots 540a and 540b.

Those skilled in the art will understand that the rotary selector cam 520 (i.e., the first cam slots 540a and 540b and the second cam slots 544a and 544b) could be configured somewhat differently so as to cause the second ring gear 360 meshingly engages both the second planet gears 362 and the first reduction carrier 314 while the third ring gear 400 meshingly engages both the third planet gears 402 and the third reduction carrier 404 to thereby providing the transmission assembly 16 with a fourth overall gear reduction or speed ratio.

Those skilled in the art will also understand that selector mechanisms of other configurations may be substituted for the selector mechanism 60 illustrated herein. These selector mechanisms may include actuators that are actuated via rotary or sliding motion and may include linkages, cams or other devices that are well known in the art to slide the second and third ring gears 360 and 400 relative to the transmission sleeve 200. Those skilled in the art will also understand that as the second and third ring gears 360 and 400 are independently movable between the active and inactive modes (i.e., the placement of one of the second and third ring gears 360 and 400 does not dictate the positioning of the other one of the second and third ring gears 360 and 400), the switch mechanism 60 could also be configured to position the second and third ring gears 360 and 400 independently of one another.

Clutch Mechanism

Figure 29:
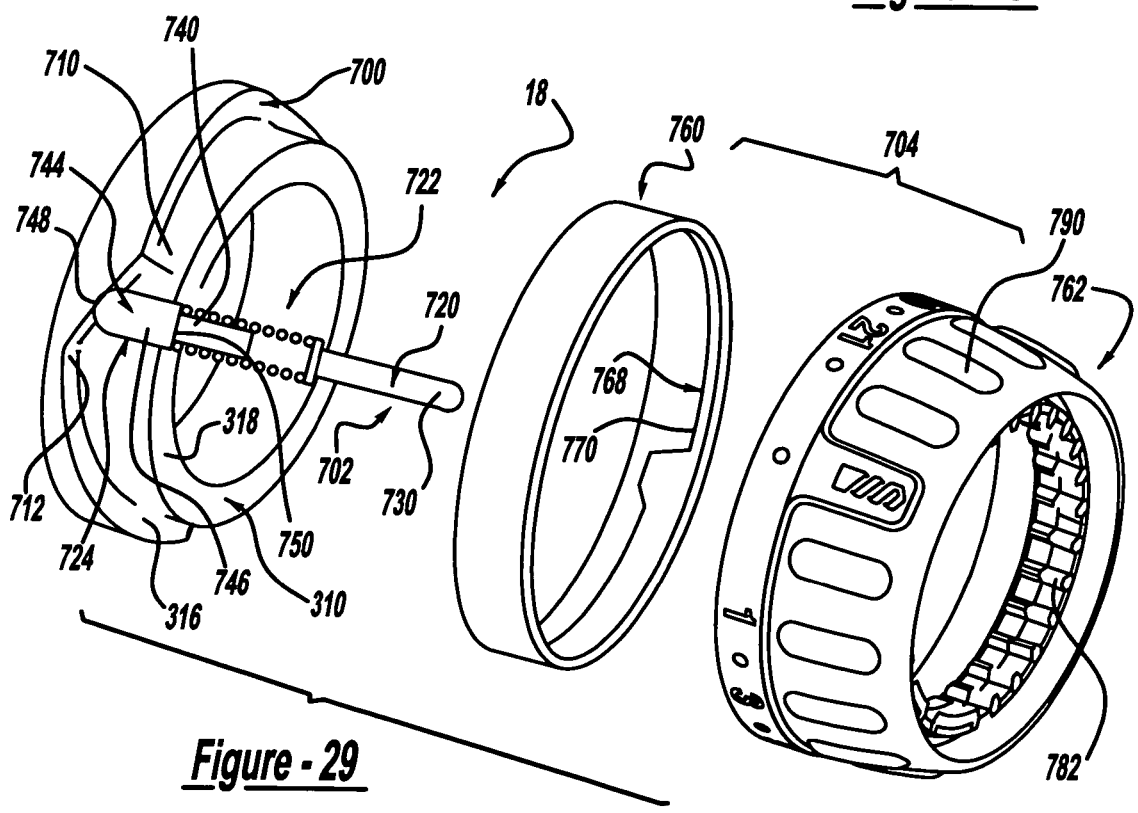
FIG. 29 is an exploded perspective view of the clutch mechanism.
Figure 29A:
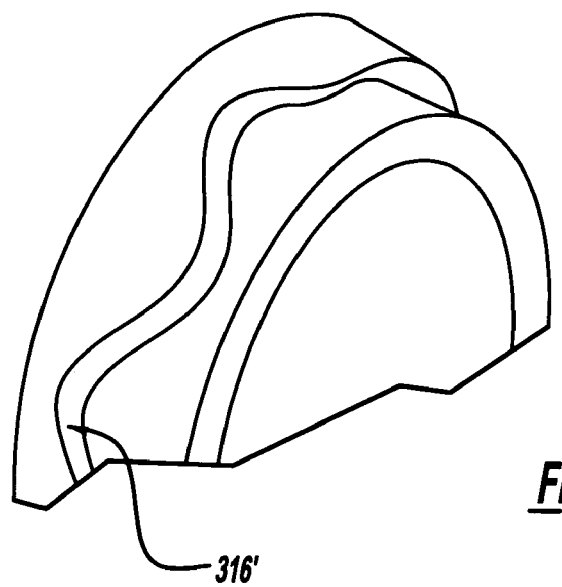
FIG. 29a is a perspective view of a portion of the clutch mechanism illustrating another configuration of the clutch member.

In FIGS. 23, 26 and 28 through 30, the clutch mechanism 18 is shown to include a clutch member 700, an engagement assembly 702 and an adjustment mechanism 704. The clutch member 700 is shown to be an annular structure that is fixed to the outer diameter of the first ring gear 310 and which extends radially outwardly therefrom. The clutch member 700 includes an arcuate clutch face 316 that is formed into the front face 318 of the first ring gear 310. The outer diameter of the clutch member 700 is sized to rotate within the portion of the hollow cavity 212 that is defined by the base 216 of the transmission sleeve 200. With specific brief reference to FIG. 29, the clutch face 316 of the example illustrated is shown to be defined by a plurality of peaks 710 and valleys 712 that are arranged relative to one another to form a series of ramps that are defined by an angle of about 18°. Those skilled in the art will understand, however, that other clutch face configurations may also be employed, such as a sinusoidally shaped clutch face 316' (FIG. 29a).

Figure 29B:
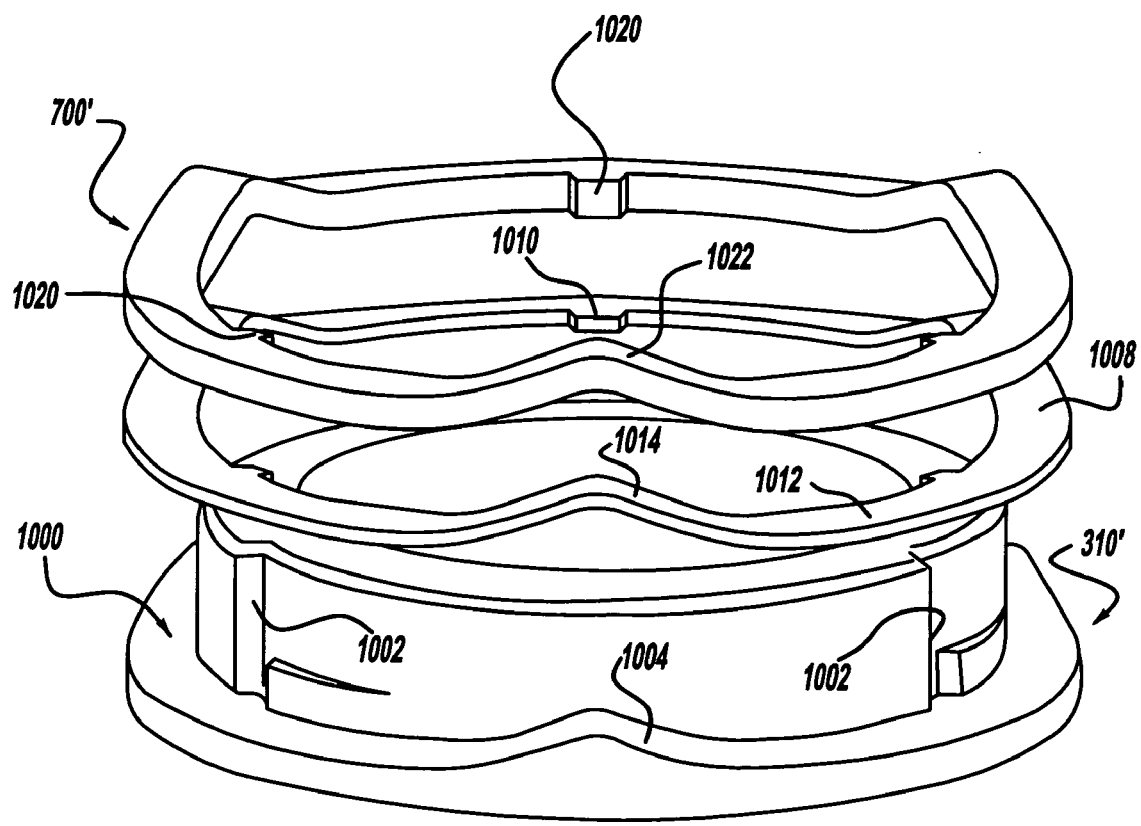
FIG. 29b is an exploded perspective view illustrating a multi-piece construction for the first ring gear and clutch member.
Figure 30:
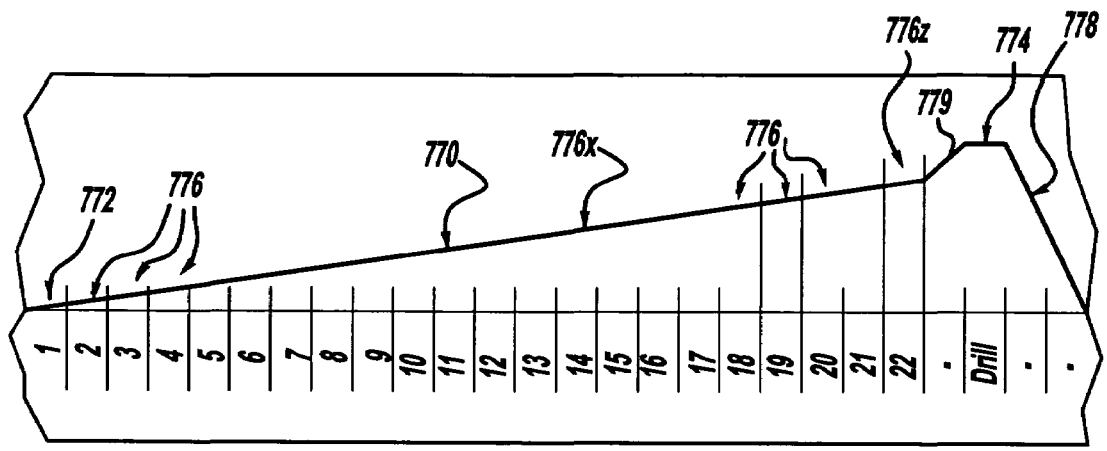
FIG. 30 is a schematic illustration of the adjustment structure in an "unwrapped" state.

While the first ring gear 310 and the clutch member 700 have been illustrated as a one piece (i.e., unitarily formed) construction, those skilled in the art will understand that they may be constructed otherwise. One such embodiment is illustrated in FIG. 29b wherein the first ring gear 310' is shown to include an annular collar 1000 and a plurality of tab apertures 1002. The annular collar 1000 is illustrated to include a plurality of ramps 1004 that have dual sloping sides, but is otherwise flat. The first ring gear 310' is otherwise identical to the first ring gear 310. An annular damper 1008 abuts the annular collar 1000 and includes a plurality of tab members 1010 that engage the tab apertures 1002 in the first ring gear 310' to prevent the damper 1008 from rotating relative to the first ring gear 310'. The damper 1008 includes a body portion 1012 that is configured to match the contour of the annular collar 1000 and as such, includes a plurality of mating ramped portions 1014 that are configured to engage each of the ramps 1004. The damper 1008 is formed from a suitable impact dampening material, such as acetyl. The clutch member 700', which is an annular member that is formed from a wear resistant material, such as hardened 8620 steel, is disposed over the damper 1008. Like the damper 1008, the clutch member 700' includes a plurality of tab members 1020, which lock into the tab apertures 1002 to prevent rotation relative to the first ring gear 310', and a plurality of mating ramped portions 1022. The mating ramped portions 1022 of the clutch member 700', however, matingly engage the mating ramped portions 1014 of the damper 1008. While the construction in this manner is more expensive relative to the previously described embodiment, it is more tolerant of high impact forces that are associated with the operation of the clutch mechanism 18.

In the particular embodiment illustrated, the engagement assembly 702 includes a pin member 720, a follower spring 722 and a follower 724. The pin member 720 includes a cylindrical body portion 730 having an outer diameter that is sized to slip-fit within the second portion 278 of the actuator aperture 274 that is formed into the pin housing portion 248 of the transmission sleeve 200. The pin member 720 also includes a tip portion 732 and a head portion 734. The tip portion 732 is configured to engage the adjustment mechanism 704 and in the example shown, is formed into the end of the body portion 730 of the pin member 720 and defined by a spherical radius. The head portion 734 is coupled to the end of the body portion 730 opposite the tip portion 732 and is shaped in the form of a flat cylinder or barrel that is sized to slip fit within the first portion 276 of the actuator aperture 274. Accordingly, the head portion 734 prevents the pin member 720 from being urged forwardly out of the actuator aperture 274.

The follower spring 722 is a compression spring whose outside diameter is sized to slip fit within the first portion 276 of the actuator aperture 274. The forward end of the follower spring 722 contacts the head portion 734 of the pin member 720, while the opposite end of the follower spring 722 contacts the follower 724. The end portion 740 of the follower 724 is cylindrical in shape and sized to slip fit within the inside diameter of the follower spring 722. In this regard, the end portion 740 of the follower acts as a spring follower to prevent the follower spring 722 from bending over when it is compressed. The follower 724 also includes a follower portion 744 having a cylindrically shaped body portion 746, a tip portion 748 and a flange portion 750. The body portion 746 is sized to slip fit within the first portion 276 of the actuator aperture 274. The tip portion 748 is configured to engage the clutch face 316 and in the example shown, is formed into the end of the body portion 746 of the follower 724 and defined by a spherical radius. The flange portion 750 is formed at the intersection between the body portion 746 and the end portion 740. The flange portion 750 is generally flat and configured to receive a biasing force that is exerted by the follower spring 722.

The adjustment mechanism 704 is also shown to include an adjustment structure 760 and a setting collar 762. The adjustment structure 760 is shaped in the form of a generally hollow cylinder that is sized to fit a housing portion 766 of the output spindle assembly 20. The adjustment structure 760 includes an annular face 768 into which an adjustment profile 770 is formed. The adjustment profile 770 includes a first adjustment segment 772, a last adjustment segment 774, a plurality of intermediate adjustment segments 776 and a ramp section 778 between the first and last adjustment segments 772 and 774. In the embodiment illustrated, a second ramp section 779 is included between the last intermediate adjustment segment 776z and the last adjustment segment 774. Also in the particular embodiment illustrated, the portion of the adjustment profile 770 from the first adjustment segment 772 through the last one of the intermediate adjustment segments 776z is formed as a ramp having a constant slope. Accordingly, a follower 780 that is coupled to the housing portion 766 of the output spindle assembly 20 is biased radially outwardly toward the inside diameter of the adjustment structure 760 where it acts against the plurality of detents 782 that are formed into the adjustment mechanism 704 (e.g., in the setting collar 762). The follower 724 and plurality of detents 782 cooperate to provide the user of tool 10 with a tactile indication of the position of the adjustment profile 770 as well as inhibit the free rotation of the adjustment structure 760 so as to maintain the position of the adjustment profile 770 at a desired one of the adjustment segments 772, 774 and 776.

The setting collar 762 is coupled to the exterior of the adjustment structure 760 and includes a plurality of raised gripping surfaces 790 that permit the user of the tool 10 to comfortably rotate both the setting collar 762 and the adjustment structure 760 to set the adjustment profile 770 at a desired one of the adjustment segments 772, 774 and 776. A setting indicator 792 is employed to indicate the position of the adjustment profile 770 relative to the housing portion 766 of the output spindle assembly 20. In the example provided, the setting indicator 792 includes an arrow 794 formed into the housing portion 766 of the output spindle assembly 20 and a scale 796 that is marked into the circumference of the setting collar 762.

During the operation of the tool 10, an initial drive torque is transmitted by the motor pinion 46 from the motor assembly 14 to the first set of planet gears 312 causing the first set of planet gears 312 to rotate. In response to the rotation of the first set of planet gears 312, a first intermediate torque is applied against the first ring gear 310. Resisting this torque is a clutch torque that is applied by the clutch mechanism 18. The clutch torque inhibits the free rotation of the first ring gear 310, causing the first intermediate torque to be applied to the first reduction carrier 314 and the remainder of the reduction gearset assembly 202 so as to multiply the first intermediate torque in a predetermined manner according to the setting of the switch mechanism 60. In this regard, the clutch mechanism 18 biases the first reduction gearset 302 in the active mode.

The magnitude of the clutch torque is dictated by the adjustment mechanism 704, and more specifically, the relative height of the adjustment segment 772, 774 or 776 that is in contact with the tip portion 732 of the pin member 720. Positioning of the adjustment mechanism 704 at a predetermined one of the adjustment segments 772, 774 or 776 pushes the pin member 720 rearwardly in the actuator aperture 274, thereby compressing the follower spring 722 and producing the a clutch force. The clutch force is transmitted to the flange portion 750 of the follower 724, causing the tip portion 748 of the follower 724 to engage the clutch face 316 and generating the clutch torque. Positioning of the tip portion 748 of the follower 724 in one of the valleys 712 in the clutch face 316 operates to inhibit rotation of the first ring gear 310 relative to the transmission sleeve 200 when the magnitude of the clutch torque exceeds the first intermediate torque. When the first intermediate torque exceeds the clutch torque, however, the first ring gear 310 is permitted to rotate relative to the transmission sleeve 200. Depending upon the configuration of the clutch face 316, rotation of the first ring gear 310 may cause the clutch force to increase a sufficient amount to resist further rotation. In such situations, the first ring gear 310 will rotate in an opposite direction when the magnitude of the first intermediate torque diminishes, permitting the tip portion 748 of the follower 724 to align in one of the valleys 712 in the clutch face 316. If rotation of the first ring gear 310 does not cause the clutch force to increase sufficiently so as to fully resist rotation of the first ring gear 310, the first reduction gearset 302 will be inactivated wherein the first ring gear 310 will rotate so as to limit the transmission of torque to the first reduction carrier 314.

Configuration of the clutch mechanism 18 in this manner is highly advantageous in that the clutch torque is sized to resist the first intermediate torque, as opposed to the output torque of the tool 10 that is generated by the multi-reduction transmission assembly 16 and transmitted through the chuck 22. In this regard, the clutch mechanism 18 may be sized in a relatively small manner, thereby improving the ability with which it can be incorporated or packaged into the tool 10. Furthermore, as the speed or gear ratios are changed after or down stream of the first ring gear 310, the clutch mechanism 18 is operable over a relatively large span of output torques. In comparison with conventional clutch mechanisms that operate to limit the output torque of a transmission, these devices are typically operable over a relatively narrow torque band, necessitating a change in their clutch spring if a considerable shift in the magnitude of the output torque is desired. In contrast, the clutch mechanism 18 of the present invention can accommodate a considerable shift in the magnitude of the output torque of the tool 10 by simply operating the transmission assembly 16 in a different (i.e., lower or higher) gear ratio.

In the operation of rotary power tools such as tool 10, it is frequently desirable to change between two clutch settings, as when the tool 10 is used to both drill a hole and thereafter install a screw in that hole. Accordingly, the adjustment mechanism 704 may be rotated relative to the output spindle assembly 20 to position the adjustment mechanism 704 at a desired one of the adjustment segments 772, 774 and 776 to perform the first operation and thereafter rotated to a second one of the adjustment segments 772, 774 and 776 to perform the second operation. In contrast to the known clutch arrangements, the adjustment mechanism 704 of the present invention is configured such that the adjustment structure 760 and the setting collar 762 are rotatable through an angle of 360°. Assuming the adjustment structure 760 to be positioned at an intermediate adjustment segment 776x, rotation of the adjustment mechanism 704 through an angle of 360° would rotate the adjustment structure 760 past the other intermediate adjustment segments 776, as well as the first and last adjustment segments 772 and 774 and the ramp section 778 such that the adjustment structure 760 would again be positioned at the intermediate adjustment segment 776x. The feature is especially convenient when it is necessary to change the clutch setting between a relatively high clutch setting and a relatively low clutch setting. In this regard, the ramp section 778 permits the setting collar 762 (and adjustment structure 760) to be rotated from highest clutch setting, corresponding to the last adjustment segment, to the lowest clutch setting, corresponding to the first clutch setting, without positioning the clutch mechanism 18 in one of the intermediate clutch settings. Accordingly, the user of the tool 10 is able to vary the clutch setting from its maximum setting to its minimum setting (and vice versa) by rotating the setting collar 762 a relatively small amount.

Figure 31:
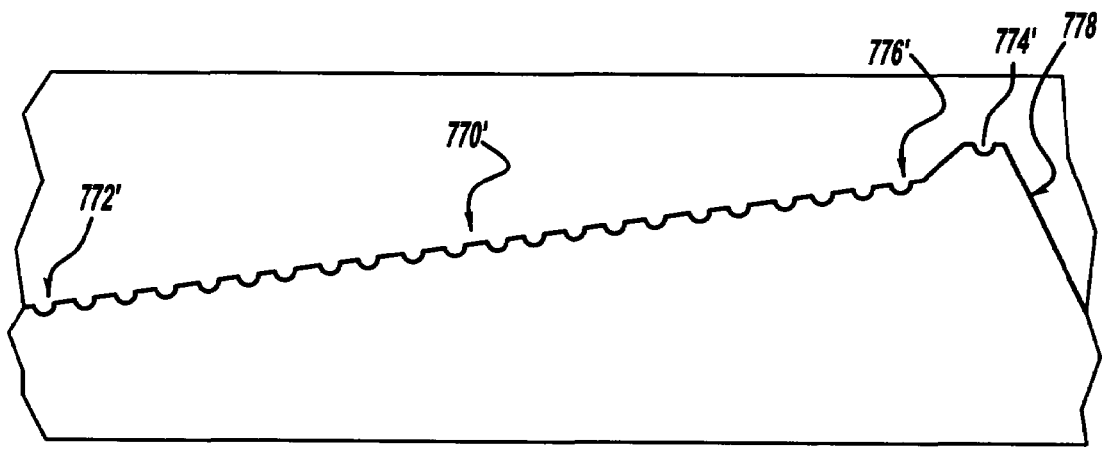
FIG. 31 is a schematic illustration similar to that of FIG. 30 but showing an alternate construction of the adjustment profile.

While the adjustment profile 770 has been described thus far as having a constant slope, those skilled in the art will appreciate that the invention, in its broader aspects, may be constructed somewhat differently. For example, the adjustment profile 770' may be formed such that each of the first, last and intermediate adjustment segments 772', 774' and 776' is detented as illustrated in FIG. 31. In this arrangement, the detents 782 in the adjustment structure 760 and the follower 780 in the housing portion 766 of the output spindle assembly 20 are unnecessary as the adjustment segments 772', 774' and 776' will cooperate with the engagement 702 to provide the user of the tool 10 with a tactile indication of the position of the adjustment profile 770', as well as inhibit the free rotation of the adjustment structure 760.

Figure 32:
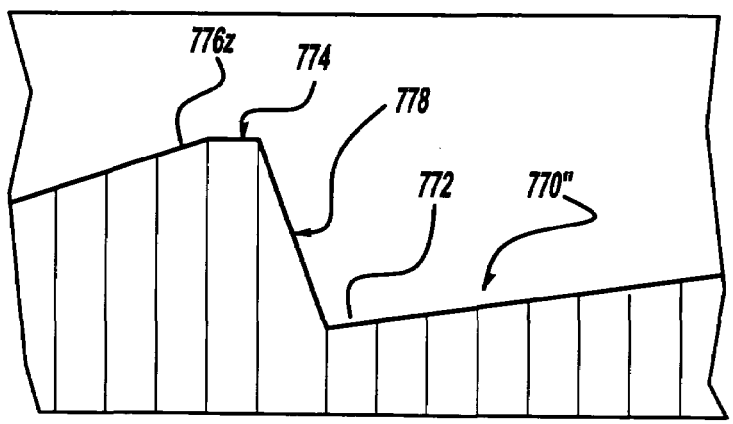
FIG. 32 is a schematic illustration similar to that of FIG. 30 but showing a portion of another alternate construction of the adjustment profile.

Another example is illustrated in FIG. 32 wherein the adjustment profile 770" is generally similar to the adjustment profile 770 except that the ramp section 779 has been omitted so that the last intermediate adjustment segment 776z is immediately adjacent the last adjustment segment 774.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A portable power tool comprising:
   a housing;
   a motor;
   a driven member;
   a transmission at least partially received in the housing, the transmission receiving torque from the motor and outputting torque to drive the driven member, the transmission including a plurality of planetary gear sets and being selectively operated in at least three overall speed reduction ratios, at least three of the planetary gear sets transmitting torque between the motor and the driven member in each of the at least three overall speed reduction ratios, wherein at least two of the plurality of planetary gear sets are operable in an active mode for performing a speed reduction and torque multiplication operation and in at least one of the at least three overall speed reduction ratios; and
   a speed selector having only one switch member and an actuator, the only one switch member forming a portion of an exterior of the portable power tool and being slidably movable between a first position, a second position and a third position, the actuator coupling the only one switch member and the transmission, the actuator being movable in response to movement of the only one switch member to cause the transmission to operate in a speed reduction ratio corresponding to a position in which the only one switch member is disposed.

2. The portable power tool of claim 1, wherein the plurality of planetary gear sets includes a first gear set, a second gear set and a third gear set, wherein the first gear set includes a planet carrier and a plurality of planet gears, the planet carrier supporting the planet gears, the second gear set including a ring gear that is not in meshing engagement with the planet gears of the first gear set, the third gear set having a ring gear.

3. The portable power tool of claim 2, wherein the ring gear of the second gear set may be selectively non-rotatably coupled to the housing to inhibit relative rotation therebetween.

4. The portable power tool of claim 3, wherein the ring gear of the second gear set may be selectively coupled to the planet carrier of the first gear set for rotation therewith.

5. The portable power tool of claim 3, wherein the ring gear of the second gear set is movable between a position where it is non-rotatably coupled to the housing and another position where it is coupled for rotation with the planet carrier of the first gear set.

6. The portable power tool of claim 2, wherein torque is transmitted from the first gear set to the second gear set and from the second gear set to the third gear set.

7. The portable power tool of claim 2, wherein the ring gear of the third gear set may be selectively non-rotatably coupled to the housing to inhibit relative rotation therebetween.

8. The portable power tool of claim 7, wherein the ring gear of the third gear set is movable between a position where it is non-rotatably coupled to the housing and another position wherein it is rotatable relative to the housing.

9. The portable power tool of claim 7, wherein the ring gear of the second gear set may be selectively non-rotatably coupled to the housing to inhibit relative rotation therebetween.

10. The portable power tool of claim 9, wherein the ring gear of the second gear set may be selectively coupled to the planet carrier of the first gear set for rotation therewith.

11. The portable power tool of claim 9, wherein the ring gear of the second gear set is movable between a position where it is non-rotatably coupled to the housing and another position where it is coupled for rotation with the planet carrier of the first gear set.

12. The portable power tool of claim 1, wherein the actuator includes a first actuator member and a second actuator member, the first actuator member coupling the only one switch member and the second actuator member, the second actuator member engaging a movable member of the transmission, the movable member of the transmission being axially movable into a plurality of positions, each of the positions affecting operation of at least one of the first, second and third gear sets.

13. The portable power tool of claim 12, wherein the movable member of the transmission includes a circumferentially extending groove and wherein a portion of the second actuator member is received in the circumferentially extending groove.

14. The portable power tool of claim 13, wherein the movable member of the transmission is the ring gear of the second gear set or the ring gear of the third gear set.

15. The portable power tool of claim 14, wherein the only one switch member is rotatable about a longitudinal axis of the transmission.

16. The portable power tool of claim 15, wherein the transmission operates in a first speed reduction ratio when the only one switch member is in the first position, wherein the transmission operates in a second speed reduction ratio when the only one switch member is in the second position, wherein transmission operates in a third speed reduction ratio when the only one switch member is in the third position, wherein the second speed reduction ratio is intermediate the first and third speed reduction ratios, and wherein the second position is intermediate the first and third positions.

17. The portable power tool of claim 13, wherein the second actuator member is a wire clip having a body portion and a pair of tab members that are disposed on opposite sides of the body portion.

18. The portable power tool of claim 17, wherein the body portion is received in the circumferentially extending groove.

19. The portable power tool of claim 13, wherein the first actuator member is guided by the housing as the only one switch member is moved between the first, second and third positions.

20. The portable power tool of claim 17, wherein the transmission operates in a first speed reduction ratio when the only one switch member is in the first position, wherein the transmission operates in a second speed reduction ratio when the only one switch member is in the second position, wherein transmission operates in a third speed reduction ratio when the only one switch member is in the third position, wherein the second speed reduction ratio is intermediate the first and third speed reduction ratios, and wherein the second position is intermediate the first and third positions.

21. The portable power tool of claim 13, wherein the transmission operates in a first speed reduction ratio when the only one switch member is in the first position, wherein the transmission operates in a second speed reduction ratio when the only one switch member is in the second position, wherein transmission operates in a third speed reduction ratio when the only one switch member is in the third position, wherein the second speed reduction ratio is intermediate the first and third speed reduction ratios, and wherein the second position is intermediate the first and third positions.

22. The portable power tool of claim 12, wherein the transmission operates in a first speed reduction ratio when the only one switch member is in the first position, wherein the transmission operates in a second speed reduction ratio when the only one switch member is in the second position, wherein transmission operates in a third speed reduction ratio when the only one switch member is in the third position, wherein the second speed reduction ratio is intermediate the first and third speed reduction ratios, and wherein the second position is intermediate the first and third positions.

23. The portable power tool of claim 12, wherein the only one switch member is rotatable about a longitudinal axis of the transmission.

24. The portable power tool of claim 23, wherein the transmission operates in a first speed reduction ratio when the only one switch member is in the first position, wherein the transmission operates in a second speed reduction ratio when the only one switch member is in the second position, wherein transmission operates in a third speed reduction ratio when the only one switch member is in the third position, wherein the second speed reduction ratio is intermediate the first and third speed reduction ratios, and wherein the second position is intermediate the first and third positions.

25. The portable power tool of claim 1, wherein the actuator includes a first actuator member that extends about a majority of a diameter of the transmission, the first actuator member engaging the only one switch member.

26. The portable power tool of claim 25, wherein the actuator includes a second actuator member that engages the first actuator member and a movable member of the transmission, the movable member of the transmission being axially movable into a plurality of positions, each of the positions affecting operation of at least one of the first, second and third gear sets.

27. The portable power tool of claim 26, wherein the only one switch member is rotatable about a longitudinal axis of the transmission.

28. The portable power tool of claim 27, wherein the transmission operates in a first speed reduction ratio when the only one switch member is in the first position, wherein the transmission operates in a second speed reduction ratio when the only one switch member is in the second position, wherein transmission operates in a third speed reduction ratio when the only one switch member is in the third position, wherein the second speed reduction ratio is intermediate the first and third speed reduction ratios, and wherein the second position is intermediate the first and third positions.

29. The portable power tool of claim 1, wherein the transmission operates in a first speed reduction ratio when the only one switch member is in the first position, wherein the transmission operates in a second speed reduction ratio when the only one switch member is in the second position, wherein transmission operates in a third speed reduction ratio when the only one switch member is in the third position, wherein the second speed reduction ratio is intermediate the first and third speed reduction ratios, and wherein the second position is intermediate the first and third positions.

30. The portable power tool of claim 2, wherein a plurality of teeth are formed on an interior surface of the housing, the teeth being employed to selectively non-rotatably couple the ring gear of the second gear set to the housing.

31. The portable power tool of claim 2, wherein a plurality of teeth are formed on an interior surface of the housing, the teeth being employed to selectively non-rotatably couple the ring gear of the third gear set to the housing.

32. The portable power tool of claim 1, wherein the only one switch member is rotatable about a longitudinal axis of the transmission.

33. The portable power tool of claim 32, wherein the transmission operates in a first speed reduction ratio when the only one switch member is in the first position, wherein the transmission operates in a second speed reduction ratio when the only one switch member is in the second position, wherein transmission operates in a third speed reduction ratio when the only one switch member is in the third position, wherein the second speed reduction ratio is intermediate the first and third speed reduction ratios, and wherein the second position is intermediate the first and third positions.

34. A portable power tool comprising:
a housing;
a motor having a motor output member;
a driven member;
a transmission in the housing, the transmission being configured to receive a rotary input from the motor output member and to produce a rotary output that is transmitted to the driven member, the transmission having a plurality of planetary transmission stages, wherein an axially-translatable member of the transmission may be positioned in a first condition, in which at least one of the planetary transmission stages is operable in an active mode, and a second position in which at least one of the planetary transmission stages is operable in another mode that is different from the active mode, and wherein the transmission is operable in at least three overall speed reduction ratios, at least three of the planetary transmission stages transmitting torque between the motor output member and the driven member in each of the at least three overall speed reduction ratios; and a speed selector having a only one switch member and an actuator, the only one switch member forming a portion of an exterior of the portable power tool, the actuator coupling the only one switch member to the transmission and coordinating movement of the only one switch member with movement of the axially-translatable member of the transmission to cause the transmission to operate in an associated one of the at least three overall speed reduction ratios, the actuator being guided by the housing as the only one switch member is moved wherein one of the housing and the actuator includes a guide member and the other one of the housing and the actuator includes a guide slot into which the guide member is received, the guide member not engaging a ring gear of the transmission.

35. The portable power tool of claim 34, wherein the another mode is a mode in which a speed and a torque of an output of the at least one of the planetary transmission stages is about equal to a speed and a torque, respectively, of an input to the at least one of the planetary transmission stages.

36. The portable power tool of claim 34, wherein the axially-translatable member of the transmission is non-rotatably coupled to the housing when the at least one of the planetary transmission stages is operated in the active mode.

37. The portable power tool of claim 34, wherein the transmission operates in a first speed reduction ratio when the only one switch member is in a first position, wherein the transmission operates in a second speed reduction ratio when the only one switch member is in a second position, wherein transmission operates in a third speed reduction ratio when the only one switch member is in a third position, wherein the second speed reduction ratio is intermediate the first and third speed reduction ratios, and wherein the second position is intermediate the first and third positions.

38. The portable power tool of claim 37, wherein the only one switch member is rotatable about a longitudinal axis of the transmission.

39. The portable power tool of claim 34, wherein the only one switch member is rotatable about a longitudinal axis of the transmission.

40. The portable power tool of claim 34, wherein the axially-translatable member of the transmission is an annular structure having a plurality of internal teeth that meshingly engage teeth formed onto another member of the transmission when the at least one of the planetary transmission stages is operated in the another mode.

41. The portable power tool of claim 40, wherein the another member of the transmission is a planet carrier.

42. The portable power tool of claim 40, wherein the annular structure includes a plurality of external teeth that meshingly engage teeth coupled to the housing when the at least one of the planetary transmission stages is operated in the active mode.

43. The portable power tool of claim 42, wherein the actuator includes a first actuator member and a second actuator member, the first actuator member coupling the only one switch member to the second actuator member, the second actuator member engaging the annular structure.

44. The portable power tool of claim 43, wherein the annular structure includes a circumferentially extending groove and wherein a portion of the second actuator member is received in the circumferentially extending groove.

45. The portable power tool of claim 44, wherein the second actuator member is a wire clip having a body portion and a pair of tab members that are disposed on opposite sides of the body portion.

46. The portable power tool of claim 45, wherein the body portion is received in the circumferentially extending groove.

47. The portable power tool of claim 44, wherein the first actuator member extends about a majority of a diameter of the transmission.

48. The portable power tool of claim 44, wherein the annular structure is a ring gear.

49. The portable power tool of claim 42, wherein the annular structure is a ring gear.

50. The portable power tool of claim 34, wherein the actuator includes a first actuator member and a second actuator member, the first actuator member extending circumferentially about at least a majority of the transmission, the second actuator member being received in a groove that is formed in the axially-translatable member of the transmission.

51. The portable power tool of claim 34, further comprising a handle housing, the handle housing being formed by a pair of clam shells that cooperate to define a handle, the housing being received in the handle housing.

52. A portable power tool comprising:
a housing;
a motor;
a driven member;
a transmission at least partially received in the housing, the transmission receiving torque from the motor and outputting torque to drive the driven member, the transmission including a plurality of planetary gear sets and being selectively operated in at least three overall speed reduction ratios, at least three of the planetary gear sets transmitting torque between the motor and the driven member in each of the at least three overall speed reduction ratios, wherein at least two of the plurality of planetary gear sets are operable in an active mode for performing a speed reduction and torque multiplication operation and in at least one of the at least three overall speed reduction ratios; and
a speed selector having a only one switch member that forms a portion of an exterior of the portable power tool, the only one switch member being slidably movable between a first position, a second position and a third position;
wherein the transmission operates in a first speed reduction ratio when the only one switch member is in the first position, wherein the transmission operates in a second speed reduction ratio when the only one switch member is in the second position, wherein transmission operates in a third speed reduction ratio when the only one switch member is in the third position, wherein the second speed reduction ratio is intermediate the first and third speed reduction ratios, and wherein the second position is intermediate the first and third positions.

53. The portable power tool of claim 52, wherein the only one switch member is rotatable about a longitudinal axis of the transmission.

54. The portable power tool of claim 52, wherein movement of the only one switch member between the first and third positions coordinates movement of at least one axially-translatable member of the transmission.

55. The portable power tool of claim 54, wherein the at least one axially-translatable member of the transmission includes an annular structure.

56. The portable power tool of claim 55, wherein the annular structure has a plurality of internal teeth that meshingly engage teeth formed onto another member of the transmission when the at least one of the planetary gear sets is operated in another mode that is different from the active mode.

57. The portable power tool of claim 56, wherein the another member of the transmission is a planet carrier.

58. The portable power tool of claim 56, wherein the annular structure includes a plurality of external teeth that meshingly engage teeth coupled to the housing when the at least one of the planetary gear sets is operated in the active mode.

59. The portable power tool of claim 58, wherein the actuator includes a first actuator member and a second actuator member, the first actuator member coupling the only one switch member to the second actuator member, the second actuator member engaging the annular structure.

60. The portable power tool of claim 59, wherein the annular structure includes a circumferentially extending groove and wherein a portion of the second actuator member is received in the circumferentially extending groove.

61. The portable power tool of claim 60, wherein the second actuator member is a wire clip having a body portion and a pair of tab members that are disposed on opposite sides of the body portion.

62. The portable power tool of claim 61, wherein the body portion is received in the circumferentially extending groove.

63. The portable power tool of claim 60, wherein the first actuator member extends about a majority of a diameter of the transmission.

64. The portable power tool of claim 60, wherein the annular structure is a ring gear.

65. The portable power tool of claim 64, wherein the at least one axially-translatable member of the transmission includes a second ring gear.

66. The portable power tool of claim 58, wherein the annular structure is a ring gear.

67. The portable power tool of claim 66, wherein the at least one axially-translatable member of the transmission includes a second ring gear.

68. The portable power tool of claim 52, wherein at least one of the planetary gear sets is in an inactive mode in at least one of the three speed ratios.

* * * * *